US012371245B2

(12) United States Patent
Takano

(10) Patent No.: US 12,371,245 B2
(45) Date of Patent: Jul. 29, 2025

(54) EXTERIOR MATERIAL, CONTAINER, AND COMBINATION OF CONTAINER AND EXTERIOR MATERIAL

(71) Applicant: KY7 INC., Tokyo (JP)

(72) Inventor: Akira Takano, Machida (JP)

(73) Assignee: KY7 INC., Tokyo (JP)

( * ) Notice: Subject to any disclaimer, the term of this patent is extended or adjusted under 35 U.S.C. 154(b) by 0 days.

(21) Appl. No.: 17/924,319

(22) PCT Filed: Nov. 17, 2021

(86) PCT No.: PCT/JP2021/042173
§ 371 (c)(1),
(2) Date: Nov. 9, 2022

(87) PCT Pub. No.: WO2023/032236
PCT Pub. Date: Mar. 9, 2023

(65) Prior Publication Data
US 2024/0217720 A1    Jul. 4, 2024

(30) Foreign Application Priority Data

Sep. 5, 2021  (JP) ................................. 2021-144377
Oct. 20, 2021 (JP) ................................. 2021-172038

(51) Int. Cl.
*B65D 81/38* (2006.01)
*A47G 19/03* (2006.01)
(Continued)

(52) U.S. Cl.
CPC ............ *B65D 81/3876* (2013.01); *B32B 3/30* (2013.01); *B32B 29/002* (2013.01); *A47G 19/03* (2013.01);
(Continued)

(58) Field of Classification Search
CPC ..... B65D 81/3876; B32B 3/30; B32B 29/002; B32B 2307/304; B32B 2307/72; A45G 19/031
(Continued)

(56) References Cited

U.S. PATENT DOCUMENTS

2008/0087677 A1* 4/2008 Robertson .......... B65D 81/3876
493/111
2012/0261427 A1  10/2012 Bates
(Continued)

FOREIGN PATENT DOCUMENTS

DE  202009011702 U1 * 2/2011 ........... B65D 25/205
JP  S50-031073 U    4/1975
(Continued)

OTHER PUBLICATIONS

Dec. 10, 2021 Office Action issued in Japanese Patent Application No. 2021-172038.
(Continued)

*Primary Examiner* — Orlando E Aviles
*Assistant Examiner* — Niki M Eloshway
(74) *Attorney, Agent, or Firm* — Oliff PLC

(57) ABSTRACT

An exterior material excellent in heat insulation, a container, and a combination of the container and exterior material. The exterior material is used by being attached to an outer periphery surface of the container main body included in the container. The exterior material is formed from a blank material including a paper-based material, and includes a plurality of projection portions including base end and tip
(Continued)

end portions, the projection portions protruding from a surface facing the outer periphery surface, and at least some of the projection portions include a low-density portion wherein a density of fibers constituting the paper-based material is smaller than that in the base end portion, and form a concealing portion at a position closer to the tip end portion than the low-density portion, the concealing portion extending in the surface direction of the blank material and concealing at least a part of the outer periphery surface.

18 Claims, 26 Drawing Sheets

(51) Int. Cl.
    *B32B 3/30*     (2006.01)
    *B32B 29/00*     (2006.01)

(52) U.S. Cl.
    CPC ..... *B32B 2307/304* (2013.01); *B32B 2307/72* (2013.01); *B32B 2439/02* (2013.01)

(58) Field of Classification Search
    USPC .......................................................... 220/739
    See application file for complete search history.

(56) References Cited

U.S. PATENT DOCUMENTS

| | | |
|---|---|---|
| 2012/0318807 A1 | 12/2012 | Leser et al. |
| 2016/0135629 A1* | 5/2016 | Robertson .......... A47G 23/0216 |
| | | 220/739 |

FOREIGN PATENT DOCUMENTS

| | | |
|---|---|---|
| JP | H10-278919 A | 10/1998 |
| JP | 2003-088457 A | 3/2003 |
| JP | 2005-139582 A | 6/2005 |
| JP | 2014-513650 A | 6/2014 |
| JP | 2014-516888 A | 7/2014 |
| KR | 100841674 B1 * | 6/2008 |
| WO | WO-2012141829 A1 * | 10/2012 ......... B65D 81/3869 |

OTHER PUBLICATIONS

Apr. 19, 2022 Office Action issued in Japanese Patent Application No. 2021-172038.
Dec. 28, 2021 Search Report issued in International Patent Application No. PCT/JP2021/042173.
Dec. 28, 2021 Written Opinion issued in International Patent Application No. PCT/JP2021/042173.

* cited by examiner

A

B

A

B

A

B

A

B

A

B

EXTERIOR MATERIAL, CONTAINER, AND COMBINATION OF CONTAINER AND EXTERIOR MATERIAL

TECHNICAL FIELD

The present invention relates to an exterior material, a container, and a combination of the container and the exterior material.

BACKGROUND ART

When a container is filled with a content having a high temperature, a rate of temperature rise on an outer periphery surface of the container needs to be moderated. Further, when a container is filled with a content having a low temperature, dew condensation on an outer periphery surface of the container needs to be reduced. For such reasons, a heat insulation property of the outer periphery surface of the container needs to be improved. Specific examples of the content described herein include a beverage such as coffee, a food such as a noodle, ice, and the like.

In response to the above requirements, Patent literatures 1 and 2 propose that a sleeve is provided so as to surround the outer periphery surface of the container as an exterior material, and a protruded projection portion is provided to the sleeve on a facing surface facing the outer periphery surface, thereby forming a space for improving heat insulation between the sleeve and the outer periphery surface of the container.

CITATION LIST

Patent Literature

Patent Literature 1: JP 50-031073 Y
Patent Literature 2: JP 2014-513650 A

SUMMARY OF INVENTION

Technical Problem

Regarding the sleeve proposed in Patent literature 1 and Patent literature 2 or a container having the same structure as the sleeve, when a container is filled with a content having a high temperature, a time during which heat insulation can be sufficiently maintained is short, and there is still room for improvement in moderating a rate of temperature rise on the outer periphery surface of the container. For example, when a container is filled with a content having a high temperature, it is difficult to carry the container by grabbing the outer periphery surface of the container if the rate of temperature rise on the outer periphery surface of the container is high. In a case where the container is carried while being held with a hand, for example, a lower end and an upper end of the container are held by fingers and the container is carried in a state of being vertically held by the fingers. In this case, the finger put on the upper end of the container may be contacted with the content of the container and burned.

Further, in the technique proposed in Patent literature 1 and Patent literature 2, when the container is filled with a content having a low temperature, there is room for improvement in the current situation where a time until dew condensation is formed on the outer periphery surface of the container is short. For example, when the container is filled with the content having a low temperature, the container grabbed by a hand on its outer periphery surface may slip off from the hand if dew condensation is quickly formed on the outer periphery surface of the container.

The present invention has been made in view of the foregoing and an object of the present invention is to provide an exterior material excellent in heat insulation, a container, and a combination of the container and the exterior material.

Solution to Problem

The present invention is based on an invention according to the following (1) to (19).
(1) An exterior material, in which:
the exterior material is for being used by being attached to an outer periphery surface of a container main body included in a container;
the exterior material is formed from a blank material including a paper-based material;
the exterior material includes a plurality of projection portions each including a base end portion and a tip end portion, the projection portions protruding from a facing surface facing the outer periphery surface; and
at least some of the projection portions include a low-density portion in which a density of fibers constituting the paper-based material is smaller than that in the base end portion, and a concealing portion is formed at a position closer to the tip end portion than the low-density portion, the concealing portion extending in a direction that intersects a thickness direction of the blank material and concealing at least a part of the outer periphery surface,
(2) The exterior material according to (1), in which
the low-density portion includes a part in which the density of the fibers constituting the paper-based material becomes smaller from the tip end portion to the base end portion,
(3) The exterior material according to (1) or (2), in which
the low-density portion is formed so as to surround a periphery of the tip end portion of the projection portion,
(4) The exterior material according to any one of (1) to (3), in which
the low-density portion includes a part in which the density of the fibers constituting the paper-based material becomes smaller from the base end portion to the tip end portion,
(5) The exterior material according to any one of (1) to (4), in which
in the low-density portion, the part in which the density of the fibers constituting the paper-based material becomes smaller from the tip end portion to the base end portion and the part in which the density of the fibers constituting the paper-based material becomes smaller from the base end portion to the tip end portion are connected,
(6) The exterior material according to any one of (1) to (5), in which
in the projection portion, a slit portion is formed between the tip end portion and the base end portion,
(7) The exterior material according to any one of (1) to (6), in which
the tip end portion also serves as the concealing portion.
(8) The exterior material according to any one of (1) to (7), in which
a compression portion is formed in the tip end portion,
(9) The exterior material according to any one of (1) to (8), in which
a flat surface is formed in the tip end portion,

(10) The exterior material according to any one of (1) to (9), in which:
the exterior material includes a first projection portion formed by the projection portion and
a second projection portion connecting at least two different first projection portions;
the second projection portion projects protrudes from the facing surface facing the outer periphery surface; and
a height of the second projection portion is smaller than that of the first projection portion,
(11) The exterior material according to (10), in which:
the second projection portion connects two adjacent first projection portions; and
a combined structure portion formed by a combination of the first projection portion and the second projection portion connected to the first projection portion is continuously formed,
(12) The exterior material according to any one of (1) to (11), in which
a protection material is laminated on a non-facing surface not facing the outer periphery surface,
(13) The exterior material according to any one of (1) to (12), in which
the projection portion is a projected embossed portion,
(14) The exterior material according to any one of (1) to (13), in which
the low-density portion is formed in a cleft-like shape at a position from the base end portion to the tip end portion of the projection portion,
(15) The exterior material according to any one of (1) to (14), in which
the projection portion forms a recessed surface on the non-facing surface not facing the outer periphery surface,
(16) The exterior material according to any one of (1) to (15), in which
at least some of the projection portions include an adhesive,
(17) The exterior material according to any one of (1) to (16)
for being used as a sleeve attached to the outer periphery surface,
(18) A container in which
the exterior material according to any one of (1) to (17) is attached to the outer periphery surface of the container main body,
(19) A combination of a container and an exterior material including:
a container including a container main body; and
the exterior material according to any one of (1) to (17).

Advantageous Effects of Invention

According to the present invention, it becomes possible to provide the exterior material excellent in heat insulation, the container, and the combination of the container and the exterior material. Specifically, when a user holds by hand and carries a container filled with a content having a high temperature, for example, the need for carrying the container by vertically holding the container by the fingers can be reduced, making it possible to reduce the possibility of the finger being in contact with the content of the container and the risk of the finger being burned by the content having a high temperature.

Further, according to the present invention, when the container is filled with a content having a low temperature, dew condensation is hardly formed on the outer periphery surface of the container. Thus, according to the present invention, for example, when the container filled with the content having a low temperature is grabbed by a hand on its outer periphery surface, it becomes possible to reduce the risk of the container being slipped off from the hand due to the dew condensation.

BRIEF DESCRIPTION OF DRAWINGS

FIG. 4A is an enlarged sectional view illustrating a region XS2 indicated by broken lines in FIG. 3.

FIG. 11B is an enlarged sectional view illustrating a region XS3 indicated by two-dot dash lines in FIG. 11A.

FIG. 12A is an enlarged sectional view illustrating a state of a vertical section taken along D-D line in FIG. 11. FIG. 12B is a sectional view illustrating a state of a vertical section taken along C-C line in FIG. 11A.

DESCRIPTION OF EMBODIMENTS

Figure 1:
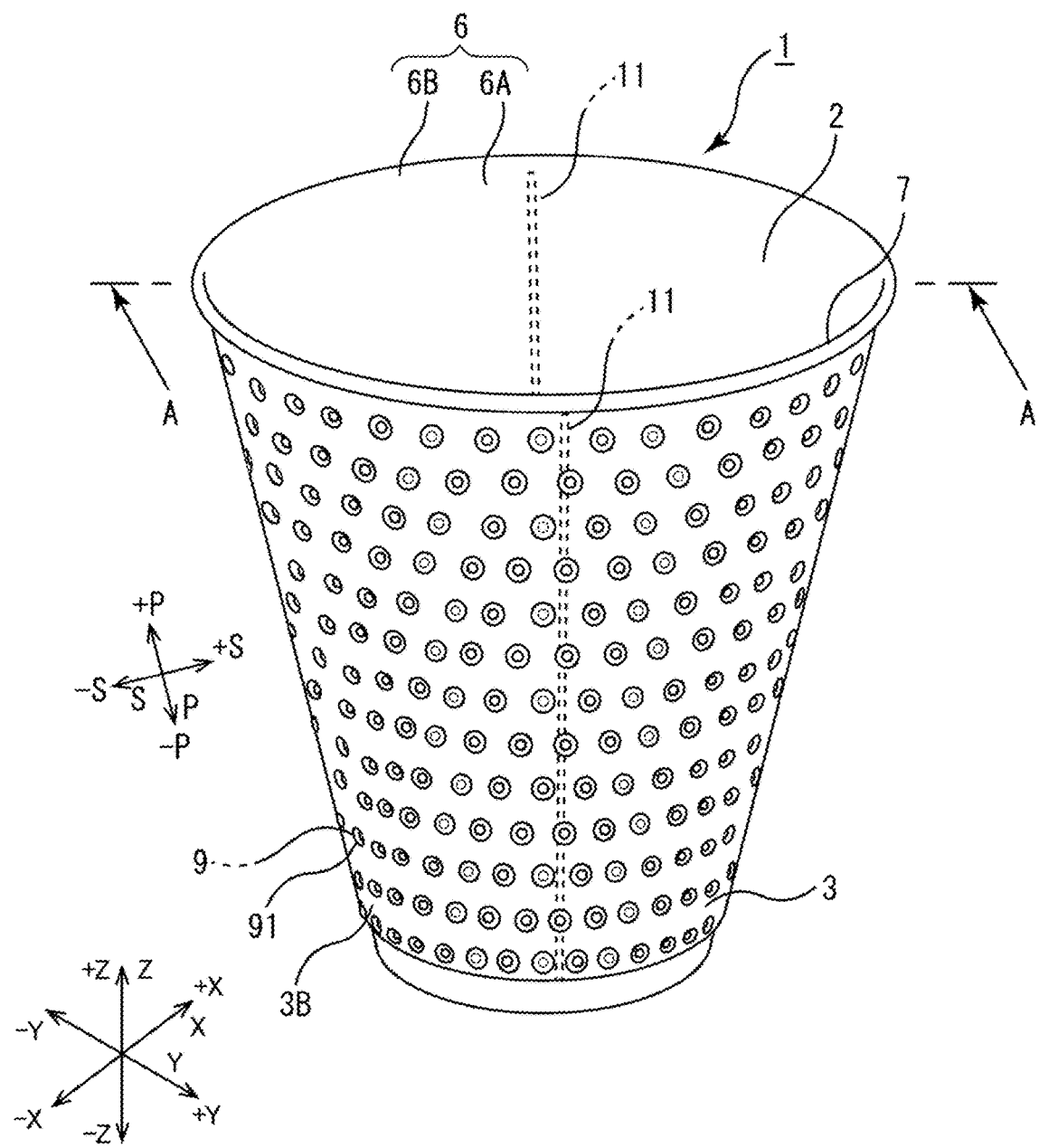
FIG. 1 is a perspective view describing one example of a first embodiment.

An exterior material and a container according to the present invention will be described. The container according to the present invention is obtained by attaching the exterior material to a container main body. Hereinafter, the container of the present invention wherein the exterior material according to the present invention is attached will be described. The exterior material of the present invention will be described in detail while the container of the present invention is described.

Hereinafter, the container wherein the exterior material according to the present invention is attached will be described with reference to drawings in the order of a first embodiment, a second embodiment, and a third embodiment. Further, application examples using the exterior material will be also described.

Note that, in the present specification and the drawings, elements that have substantially the same functions and configurations are denoted with the same reference signs, and repeated explanation is omitted.

The following description provides preferable specific examples of the present invention, and the contents of the present invention are not limited to these embodiments and the like. Further, the following description uses directions such as front and back, left and right, and an upper side and a lower side, and directions in a horizontal plane in consideration of convenience of description. However, the contents of the present invention are not limited to these directions. In an example in FIG. 1, a description is provided based on the followings: a Z-axis direction represents an upper-lower direction (upper and lower sides are represented by directions +Z and −Z, respectively), directions along an X-axis and Y-axis perpendicular to each other, positioned on a plane having the Z-axis direction as a normal, are represented by X-axis and Y-axis directions, respectively. Further, an X-Y plane that contains the X-axis and the Y-axis represents a horizontal plane. The X-axis, Y-axis, and Z-axis are defined in the same manner in the drawings other than FIG. 1. A relative magnitude ratio of a size or the like shown in each drawing of FIG. 1 to FIG. 26 is used for convenience and is not intended to limit the actual magnitude ratio.

Further, in FIG. 1 and FIG. 2, an upper-lower direction along a surface of an exterior material 3 described below is represented by a direction P, an upper direction along the surface of the exterior material 3 is represented by a direction +P, and a lower direction along the surface of the exterior material 3 is represented by a direction −P. A thickness direction of a paper-based sheet 18 described below forming the exterior material 3 is represented by a direction S, a direction from the center position of the thickness direction of the exterior material 3 to a facing surface 3A is represented by a direction +S, and a direction from the center position of the thickness direction of the exterior material 3 to a non-facing surface 3B is represented by a direction −S. The upper direction in the description of the direction P, the direction +P, and the direction −P coincides with a direction heading toward an opening portion 6 of a container 1 described below, while the lower direction coincides with a direction heading toward a bottom surface portion 5 of the container 1. The direction P, the direction +P, the direction −P, the direction S, the direction +S, and the direction −S are defined in the same manner from FIG. 3 to FIG. 26.

1 First Embodiment

[1-1 Configuration]

Figure 2:
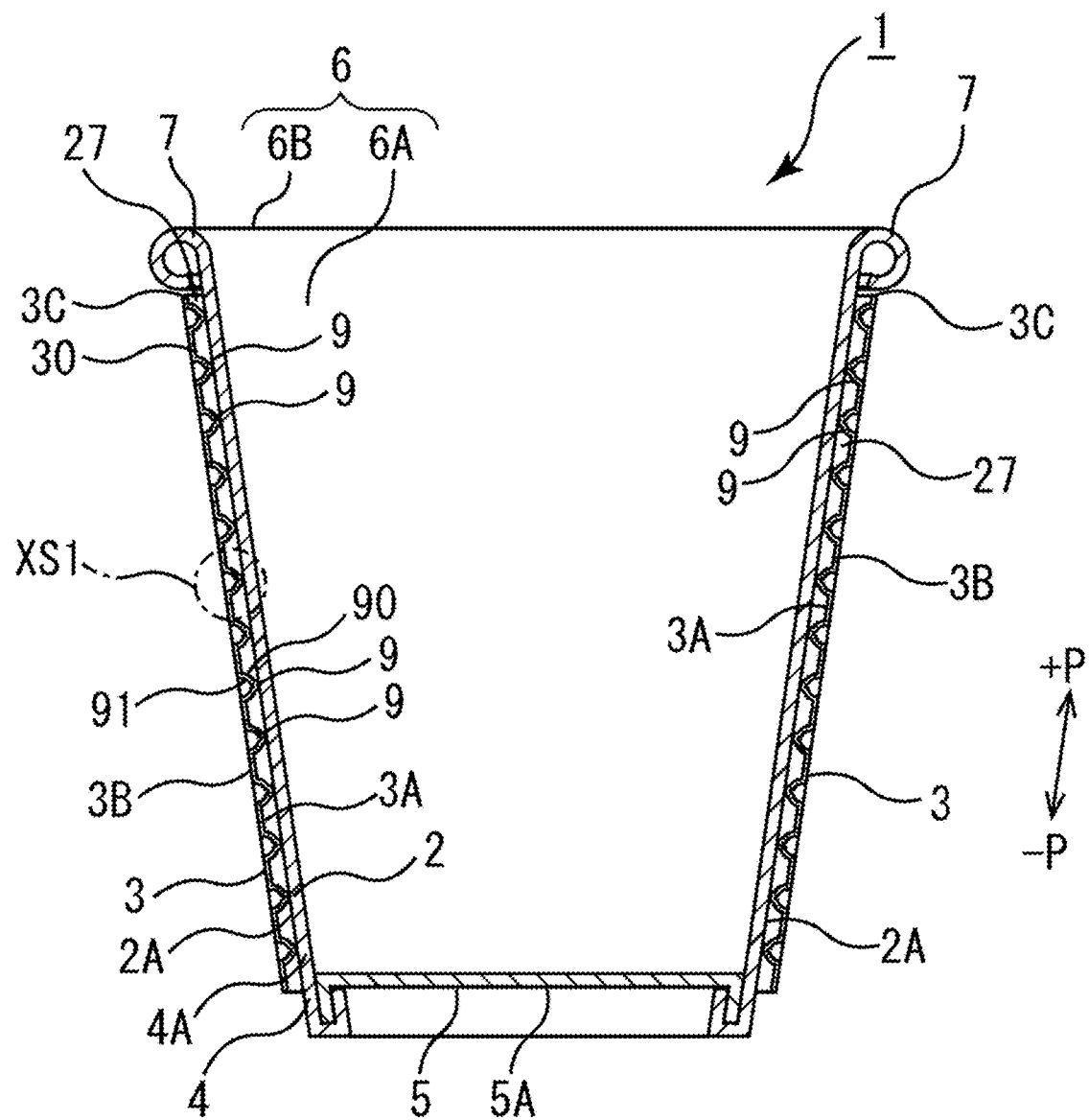
FIG. 2 is a sectional view describing one example of the first embodiment.
Figure 3:
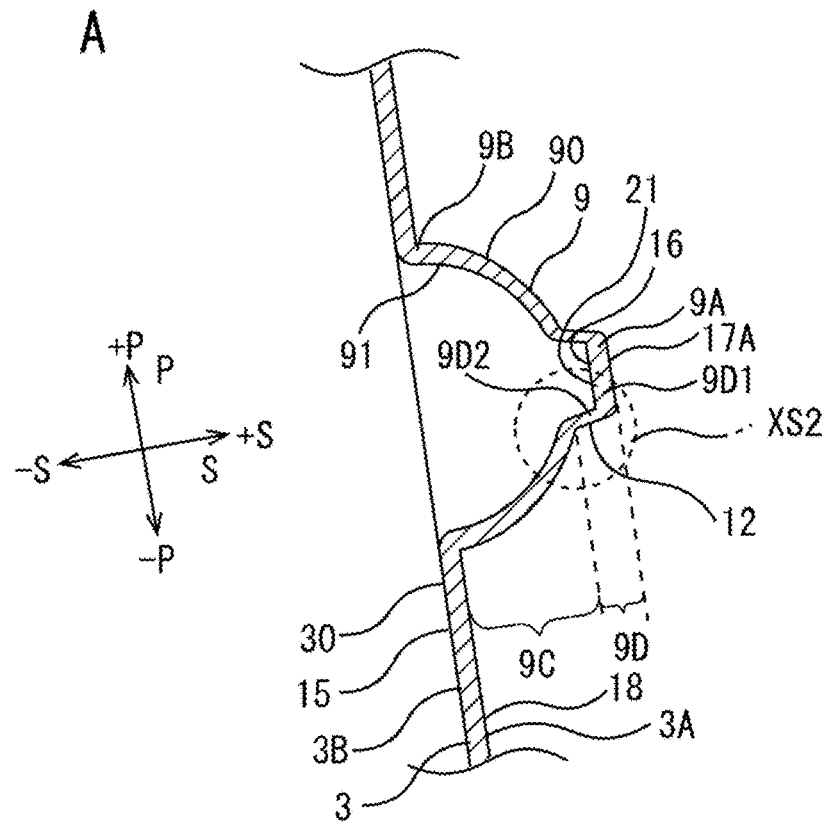
FIG. 3A is an enlarged sectional view illustrating a region XS1 indicated by broken lines in FIG. 2 and an enlarged sectional view describing one example of a projection portion of the first embodiment.
FIG. 3B is an enlarged plan view describing one example of the projection portion of the first embodiment.
Figure 3:
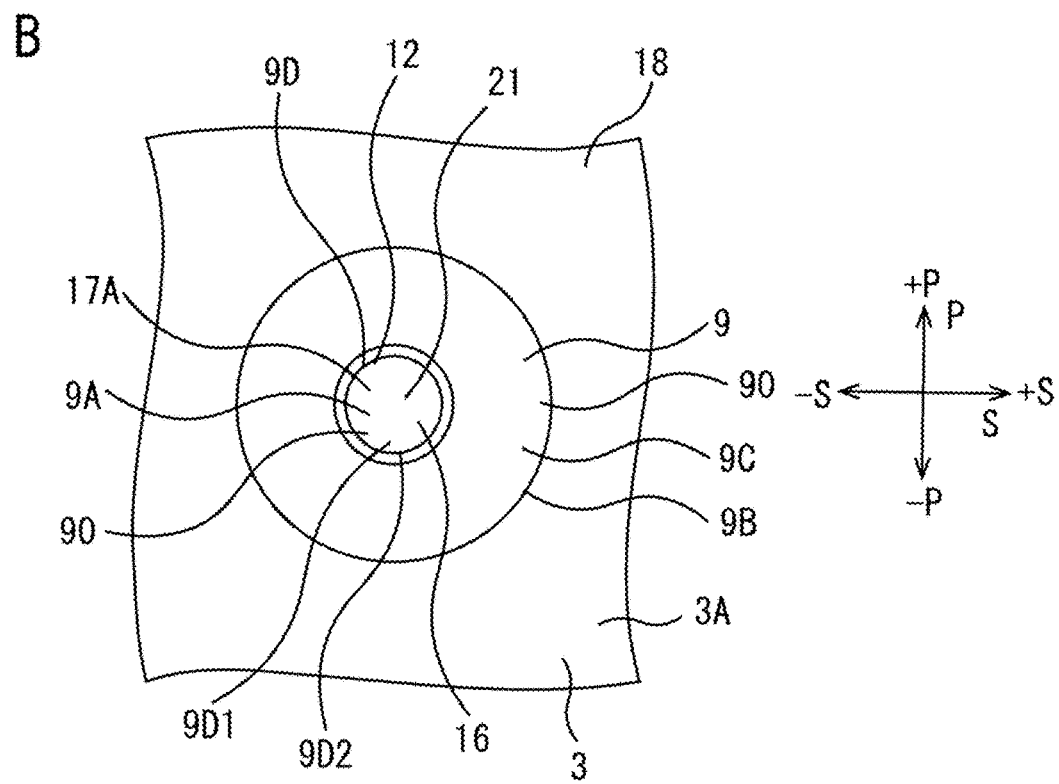
Figure 4:
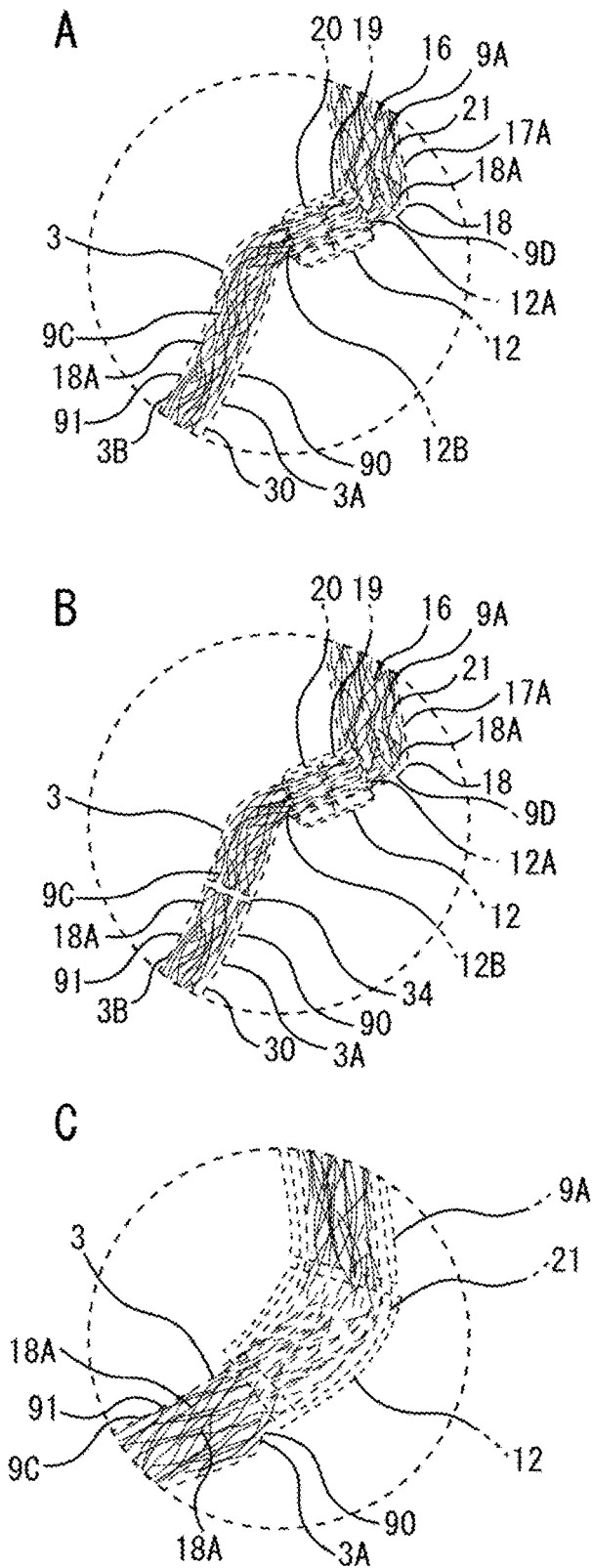
FIGS. 4A, 4B, and 4C each shows a schematic view describing one example of an interlacing state of fibers at a tip end of the projection portion of the first embodiment. Further.
Figure 5:
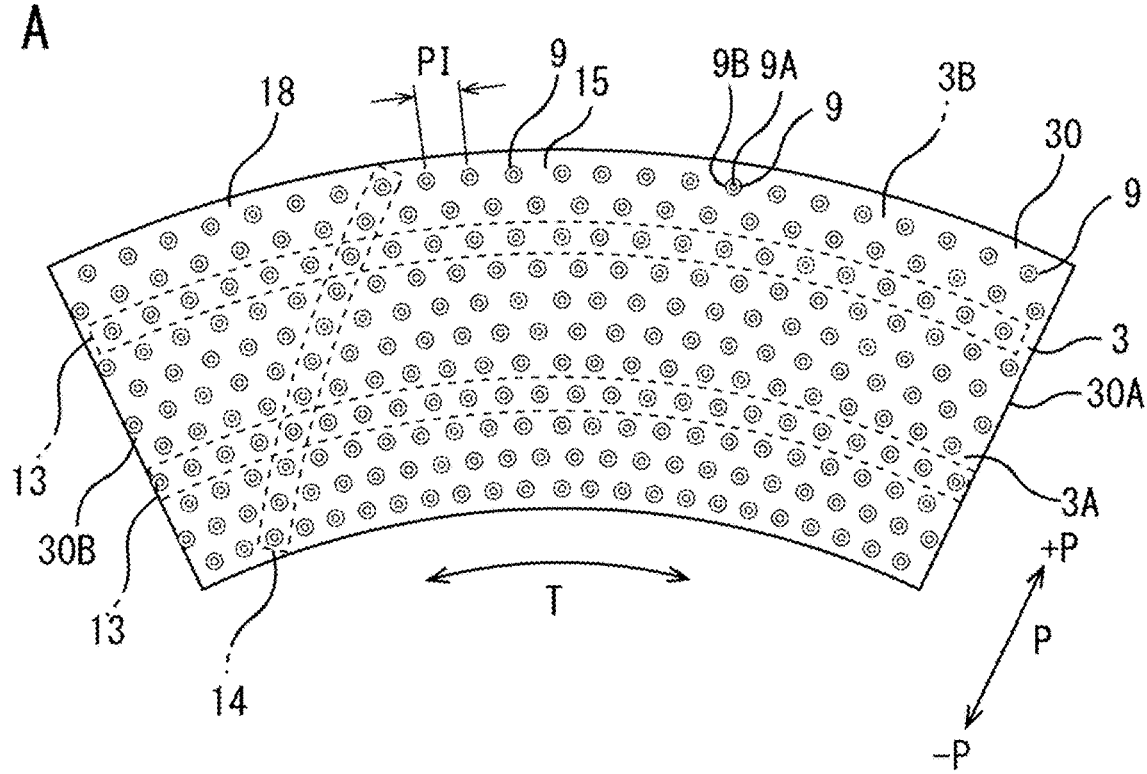
FIGS. 5A and 5B each shows a plan view describing one example of a blank material for an exterior material of the first embodiment.
Figure 5:
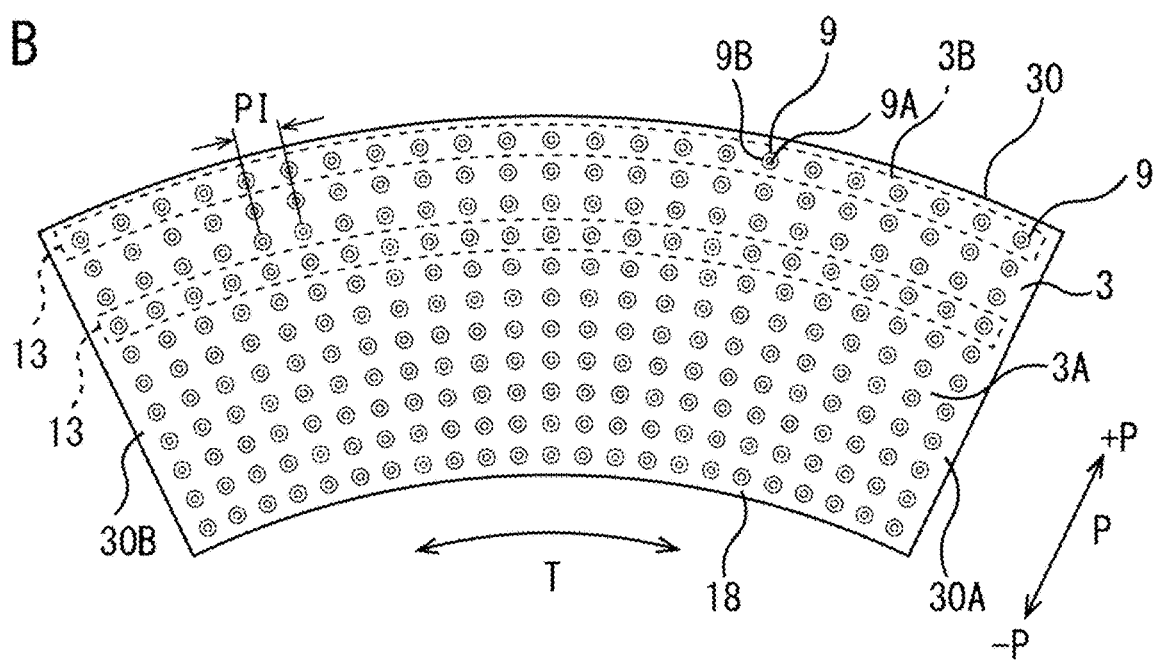
Figure 6:
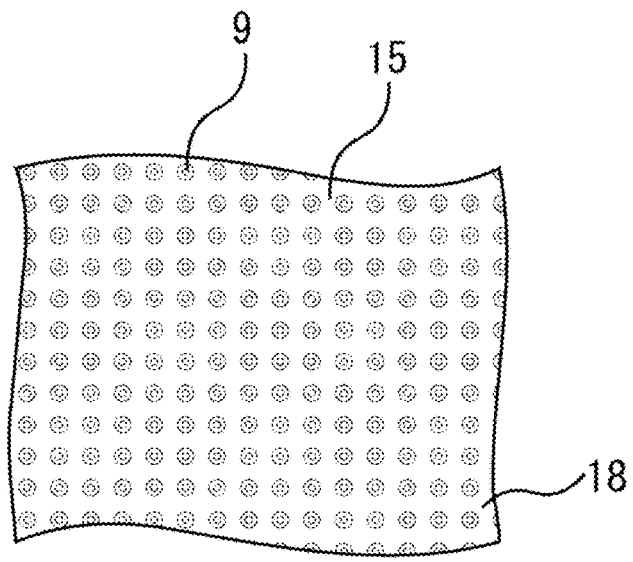
FIGS. 6A to 6C each shows a plan view describing an example of a layout of the projection portion.
Figure 6:
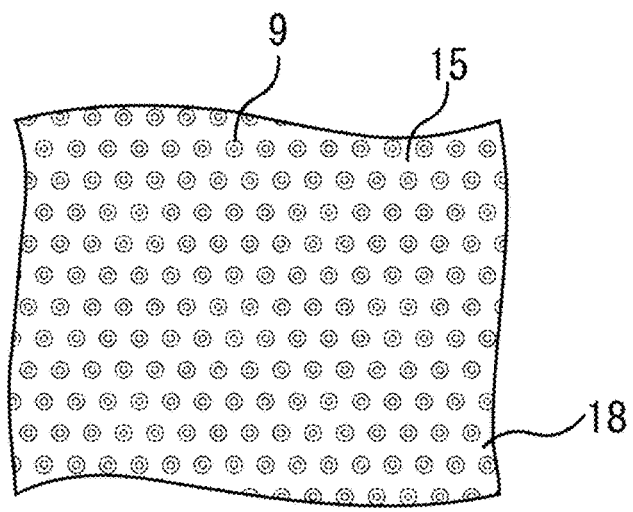
Figure 6:
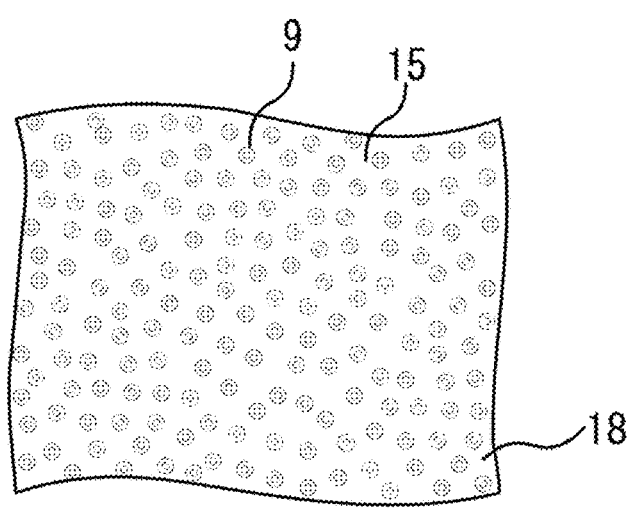
Figure 7:
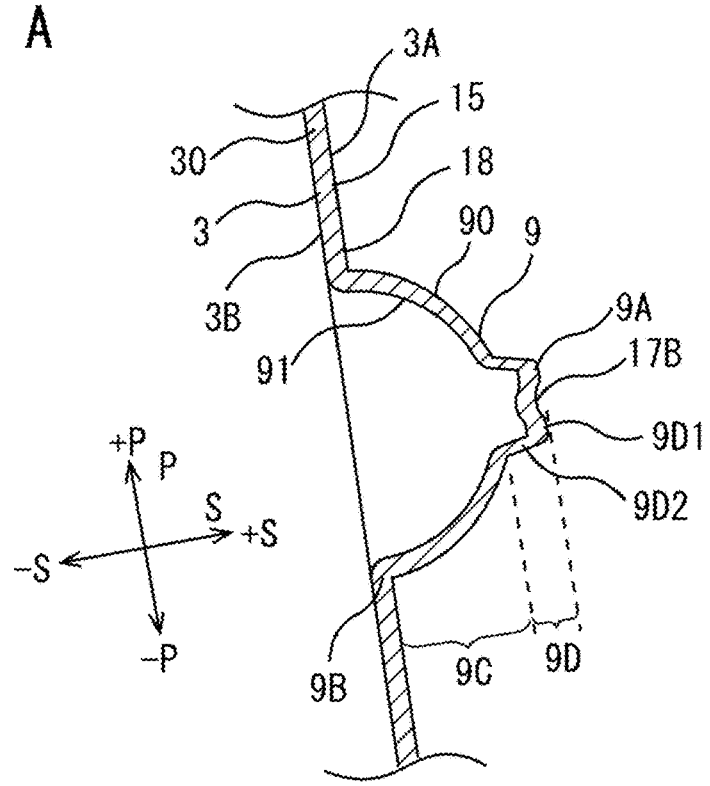
FIGS. 7A and 7B each shows an enlarged sectional view describing one example of the projection portion of the first embodiment.
Figure 7:
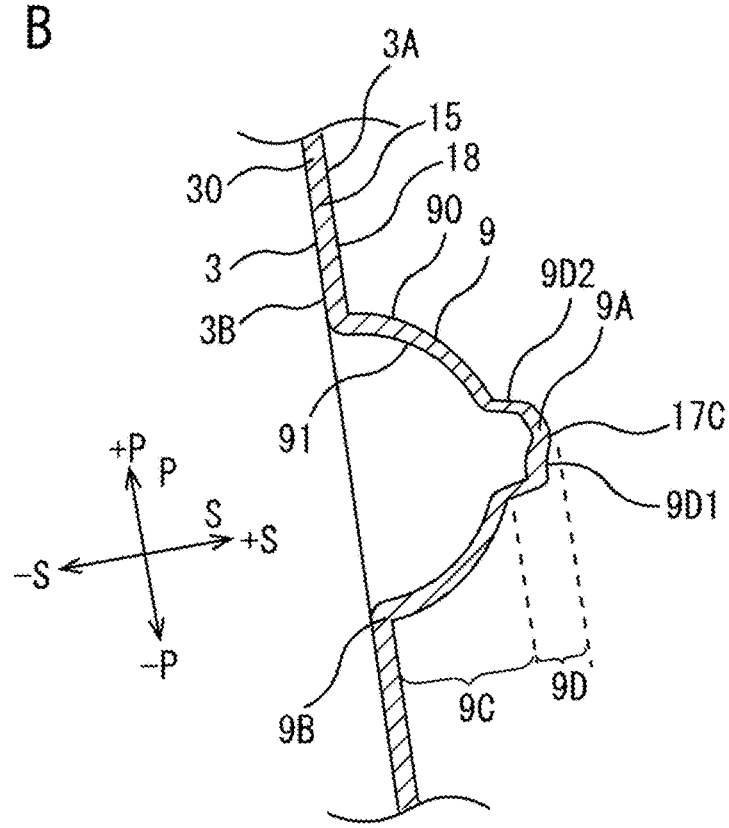
Figure 9:
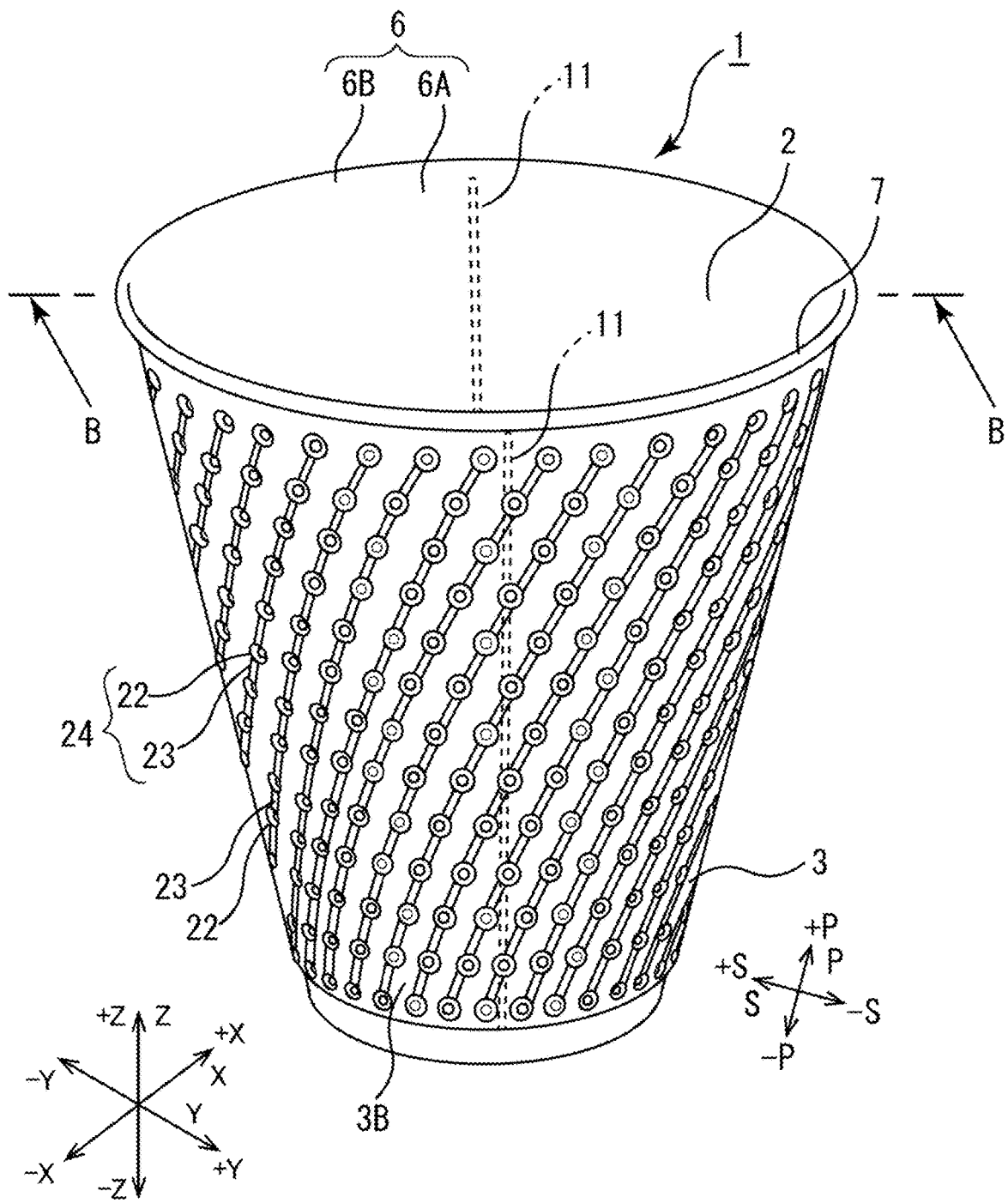
FIG. 9 is a perspective view describing one example of a second embodiment.
Figure 10:
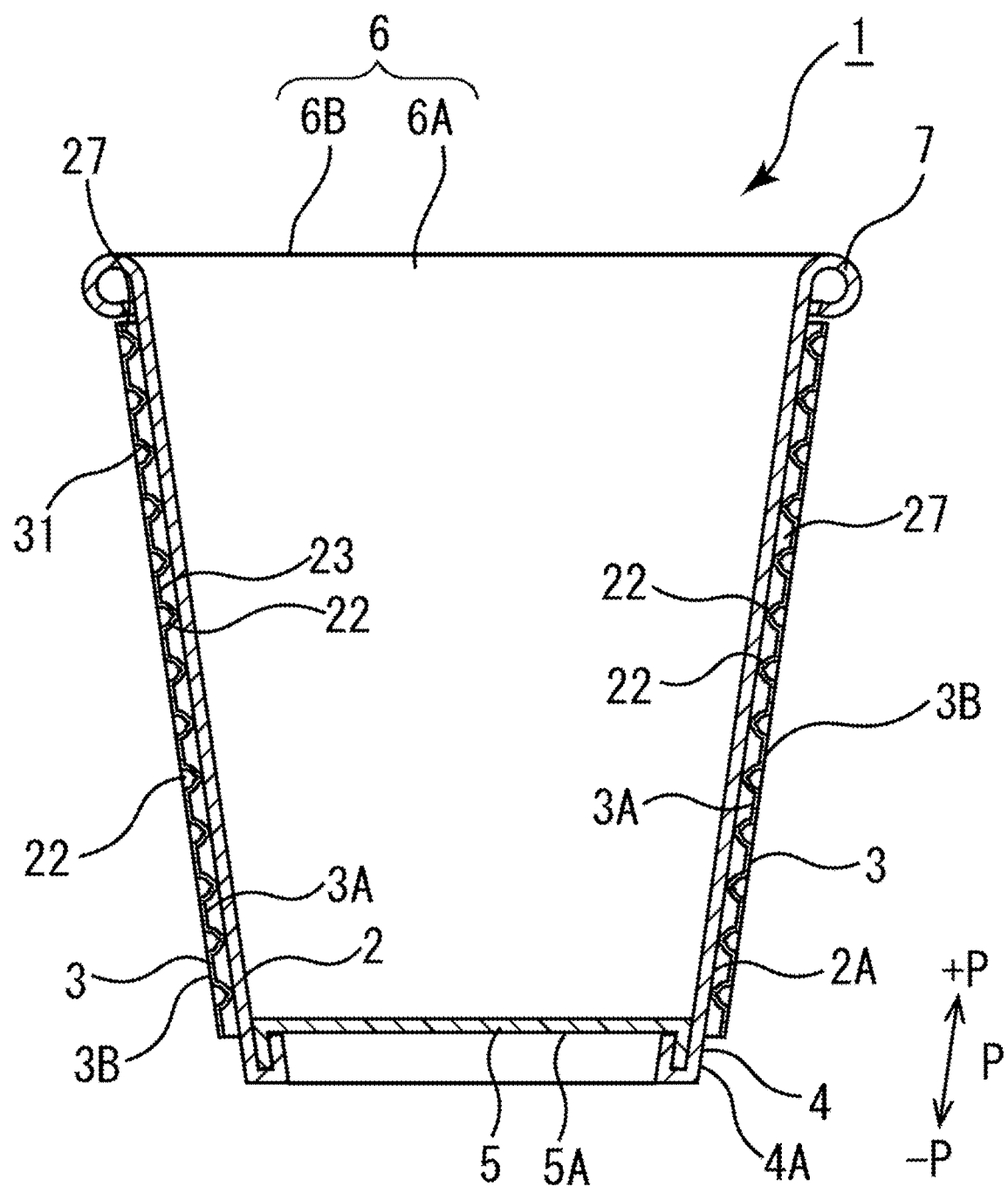
FIG. 10 is a sectional view describing one example of the second embodiment.

As shown in FIG. 1 and FIG. 2, a container 1 according to the first embodiment includes a container main body (hereinafter also simply referred to as "main body") 2 and an exterior material 3. FIG. 1 is a perspective view describing one example of the container 1 according to the first embodiment. FIG. 2 is a sectional view describing a state of a vertical section taken along A-A line in FIG. 1, showing one example of the container 1 according to the first embodiment. Note that, in FIG. 1 and FIG. 2, layouts of a projection portion 9 do not completely match for convenience of description. This also applies to the relation between FIG. 9 and FIG. 10. FIG. 10 is a sectional view describing a state of a vertical section taken along B-B line in FIG. 9, showing one example of the container 1 according to the second embodiment. In FIG. 9 and FIG. 10, layouts of the projection portion 9 do not completely match for convenience of description.

(Main Body)

In the example shown in FIG. 1 and FIG. 2, the main body 2 includes a body portion 4 forming a side wall, the body portion 4 being formed by a body material 4A, and a bottom surface portion 5 forming a bottom surface, the bottom surface portion 5 being formed by a bottom surface material 5A. However, the structure of the main body 2 is not particularly limited thereto. In the main body 2, the body material 4A is bonded to a periphery of the bottom surface material 5A. The main body 2 forms a space in its inside with the body material 4A and the bottom surface material 5A and has a bottomed structure with an upper end side being opened, thereby forming an opening portion 6. The opening portion 6 includes an opening 6A at its upper end side and an opening edge portion 6B forming a contour of the opening portion 6. In the main body 2, the opening edge portion 6B may be appropriately attached with a lid body (not shown).

The bottom surface material 5A can be produced by using a blank material (a blank material for a bottom surface material) formed by subjecting a specific raw fabric material to a punching process or the like. Like the bottom surface material 5A, the body material 4A can be produced by using a blank material (a blank material for a body material) formed by subjecting a specific raw fabric material to a punching process or the like. The body material 4A is annularly formed. The body material 4A can be formed by bonding both end portions of the blank material for the body material in a state of being annularly wound.

Further, a shape of the main body 2 is not particularly limited. In the example in FIG. 1, the body portion 4 of the main body 2 is formed in a taper shape tapered in a lower direction (a direction −Z). Note that the body portion 4 may be formed in a taper shape tapered in an upper direction or a non-taper shape (a cylindrical shape with a constant outer diameter).

(Curled Portion)

As shown in the example in FIG. 1, the opening edge portion 6B of the main body 2 may be provided with a curled portion 7. The curled portion 7 is a portion having a wound structure which can be formed by winding the upper end side of the body material 4A outwardly. Forming the curled portion 7 allows an end surface 3C of the exterior material 3 to be hidden by the curled portion in a planar view of the container 1 when the exterior material 3 is attached to an outer periphery surface of the body portion 4 (an outer periphery surface 2A of the main body 2). Further, a space (a gap 27) between the exterior material 3 and the outer periphery surface 2A of the main body 2 can be hidden by the curled portion. This can, when liquid is filled in the main body 2 as a content, reduce the risk of the liquid entering the gap 27 between the exterior material 3 and the outer periphery surface 2A of the main body 2.

Note that FIG. 1 merely shows an example, and the curled portion 7 may be omitted as shown in FIG. 18A. Further, as shown in FIG. 18B, a folded portion 8 may be formed instead of the curled portion 7. The folded portion 8 can be formed by folding the upper end side of the body material 4A outwardly. Note that the folded portion 8 in FIG. 18B merely shows an example, and the folded portion 8 may have a structure formed by folding the upper end side of the body material 4A inwardly.

A material of the container 1 is not particularly limited, and examples thereof include a paper-based material, a resin material, a metal material and the like.

(Exterior Material)

The exterior material 3 is attached to the outer periphery surface 2A of the main body 2. In the example in FIG. 1 and FIG. 2, the outer periphery surface 2A of the main body 2 is an outside surface of the side wall of the container 1 and also serves as an outer periphery surface of the body material 4A. Further, in this example, the exterior material 3 is attached on the outer periphery surface 2A of the main body 2 so as to surround the outer periphery surface 2A of the main body 2.

A width of the exterior material 3 in the upper-lower direction (a direction P) along a surface of a paper-based sheet 18 described below is not limited. Thus, for the exterior material 3, a range covering the outer periphery surface 2A of the main body 2 in the upper-lower direction is not particularly limited. In the example in FIG. 1 and FIG. 2, the exterior material 3 covers the outer periphery surface 2A of the main body 2 from a lower end of the curled portion 7 to the position of the bottom surface portion 5 of the main body 2. However, this merely shows an example, and the exterior material 3 may cover the entire surface of the outer periphery surface 2A of the main body 2 or a part of the outer periphery surface 2A of the main body 2.

(Shape of Exterior Material)

A shape of the exterior material 3 is not particularly limited. However, it preferably corresponds to the shape of the outer periphery surface 2A of the main body 2. In the example in FIG. 1 and FIG. 2, the exterior material 3 is formed in an annular cylindrical shape and also in a taper shape tapered in the lower side. Such an exterior material 3 can be formed by forming a blank material 30 (a blank material for an exterior material) into a shape corresponding to the shape of the outer periphery surface 2A of the main body 2. Further, the exterior material 3 may be formed by winding the blank material 30 into the shape of the outer periphery surface 2A of the main body 2. The blank material 30 is formed by using a paper-based material forming the exterior material 3. In the example in FIG. 1, as described below, the blank material 30 is formed as an embossed sheet formed in an arch shape as shown in FIG. 5A. FIG. 5A is a plan view illustrating an example of the blank material 30 forming the exterior material 3 attached in the example of the container 1 in FIGS. 1 and 2. In FIG. 5A, an arrow P indicates a radial direction of a fan forming the blank material 30, and this direction is also a direction extending from the bottom to the top of the exterior material 3 when the blank material 30 is formed into the exterior material 3. The same applies to FIG. 11A, FIG. 17, and FIG. 20.

(Attaching Mode of Exterior Material to Main Body)

The exterior material 3 may be detachably attached to or may be fixed to the outer periphery surface 2A of the main body 2 as long as the exterior material 3 is attached to it. In the example in FIG. 1, the exterior material 3 is fixed to the outer periphery surface 2A of the main body 2. In this case, the exterior material 3 is partially bonded to the outer periphery surface 2A of the main body 2. For example, in the example in FIG. 1, the facing surface 3A of the exterior material facing the outer periphery surface 2A and the outer periphery surface 2A of the main body 2 are bonded to each other at two different sites in joint portions 11 having a linear shape extending in the upper-lower direction. Note that the joint portion 11 is not limited to this example and may be formed in a dot shape. The joint portion 11 may be formed in a planar shape having an area within a range which would not completely deteriorate the effects of the present invention.

As the case where the exterior material 3 is detachably attached to the main body 2, for example, as described below, a case where the exterior material 3 is used as a sleeve can be mentioned.

(Material of Exterior Material)

The exterior material 3 is preferably formed using a paper-based material. Examples of the paper-based material include, in addition to so-called paper produced by agglutinating a plant fiber or other fibers, a chemical fiber paper, a synthetic paper, a waterproof paper, a coated paper, an alternative paper, a parchment, a woolen paper, a glass fiber paper, a stone paper, a porcelain paper and the like. As the paper-based material, a recycled paper or a non-recycled paper may be used. Note that, as the material of the exterior material 3, use of a non-paper material is not prohibited as long as a fiber material is included. Examples of the non-paper material include a cloth-based material (a woven fabric material, a nonwoven fabric material) and the like. Examples of the nonwoven fabric material include so-called an air-laid sheet in which crushed pulp accumulated by an air flow is bonded and formed into a sheet shape, a pulp-based material, and nonwoven fabric of a fiber such as a natural fiber material or a synthetic fiber. As the material of the exterior material 3, a material obtained by combining the paper-based material and the non-paper material can be used.

(Projection Portion)

The exterior material 3 includes a plurality of the projection portions 9. The projection portion 9 protrudes from the facing surface 3A facing the outer periphery surface 2A among surfaces of the exterior material 3. The projection portion 9 includes a base end portion 9B and a tip end portion 9A. The tip end portions 9A of at least some of the projection portions 9 among the projection portions 9 are in contact with the outer periphery surface 2A. Note that the tip end portions 9A of all projection portions 9 may be in contact with the outer periphery surface 2A.

(Pitch of Projection Portions)

A pitch PI of the projection portions 9 is not particularly limited. However, it is preferably larger than the outer diameter (the diameter) of the base end portion 9B of the projection portion 9. As shown in the example in FIG. 5A, the pitch PI of the projection portions 9 represents a distance between the centers of the projection portions 9 adjacent to each other. Increasing the pitch PI of the projection portions 9 can create a state in which the adjacent projection portions 9 are slightly apart from each other. Further, when the projection portions 9 are slightly apart from each other, it becomes easy to form a low-density portion 12 described below in the production step of the exterior material 3. Further, the pitch of the adjacent projection portions 9 may be constant as shown in FIG. 6A and FIG. 6B or varied as shown in FIG. 5A, FIG. 5B, and FIG. 6C. FIG. 6A and FIG. 6B are diagrams each showing one example of a layout of the projection portions 9. In FIG. 6A, the projection portions 9 are arranged in a grid with regular intervals of the pitches, while, in FIG. 6B, the projection portions 9 are arranged in a staggered form with regular intervals of the pitches. In FIG. 6C, the pitches and positions of the projection portions 9 are irregularly formed. The pitch of the projection portions 9 represents a distance between the centers of the adjacent projection portions 9.

(Layout of Projection Portions)

A layout of the projection portions 9 is not particularly limited. However, as shown in example in FIG. 1 and FIG. 2, the layout is preferably made such that at least some of the projection portions 9 are dispersedly arranged. For example, in the example in FIG. 1 and FIG. 2, a plurality of the projection portions 9 is dispersedly arranged such that the base end portions 9B of the adjacent projection portions 9 are apart from each other. Further, in the example in FIG. 1 and FIG. 2, the layout of the projection portions 9 is made such that, when the exterior material 3 is attached to the main body 2, the projection portions 9 are lined to form a projection portion lateral row 13 in a manner such that the pitch PI of the projection portions 9 adjacent in the circumferential direction of the outer periphery surface 2A of the main body 2 is made constant, and a plurality of the projection portion lateral rows 13 is arranged in the upper-lower direction. Further, the pitches of the projection portions 9 forming the projection portion lateral row 13 arranged in the upper side (a direction +P side) is made larger than the pitches of the projection portions 9 forming the projection portion lateral row 13 arranged in the lower side (a direction −P side). In such a layout of the projection portions 9, the projection portions 9 are arranged so as to form a plurality of spiral rows 14 in which the projection portions 9 are spirally arranged. Further, in this layout of the projection portions 9, as shown in FIG. 5A, the projection portions 9 are arranged along a circumferential direction (a direction of an arrow T) of the blank material 30 and the pitch PI of the projection portions 9, which are adjacent to each other in the direction T, in the direction +P of the direction of the arrow P is made larger than the pitch PI of the projection portions 9, which are adjacent to each other in the direction T, in the direction −P in a state of the blank material 30 which is obtained by extending the exterior material 3. In FIG. 5A, the projection portions 9 are not aligned in the direction of the arrow P. However, as shown in FIG. 5B, the projection portions 9 may be aligned in the direction of the arrow P.

(Shape of Projection Portion)

In the example in FIG. 1 and FIG. 2, as shown in FIG. 3A and FIG. 3B, a projected surface 90 of the projection portion 9 is formed in a shape in which a main raised portion 9C formed in a substantially dome shape includes a raised portion (also referred to as "sub-raised portion 9D") on its tip end side. Note that FIG. 3A and FIG. 3B are a sectional view and a plan view illustrating one example of the projection portion 9, respectively. FIG. 3A is an enlarged sectional view illustrating the projection portion 9 in a region XS1 surrounded by broken lines in FIG. 2. Note that the projection portion 9 shown in FIG. 3A and FIG. 3B merely represents an example and is not intended to limit the shape of the projection portion 9. For example, the main raised portion 9C of the projection portion 9 may be formed in a pyramid shape such as a triangular pyramid shape or a quadrangular pyramid shape, a truncated cone shape, a column shape, or the like. Further, the sub-raised portion 9D may be formed on the tip end side of the projection portion 9 even when the main raised portion 9C is formed in a pyramid shape such as a triangular pyramid shape or a quadrangular pyramid shape, a truncated cone shape, a column shape, or the like. In the example in FIG. 1, the sub-raised portion 9D is formed in a disc shape. However, this merely represents an example, and the shape of the sub-raised portion 9D is not limited to the shape in FIG. 3A and FIG. 3B.

(Base End Portion)

A base end portion 9B of the projection portion 9 is configured by a part where the projection portion 9 rises from a peripheral portion 15 formed outside the projection portion 9. The peripheral portion 15 is formed between the adjacent projection portions 9.

(Tip End Portion)

The tip end portion 9A of the projection portion 9 can be defined as a specific part including a tip end of the projection portion 9. In the example in FIG. 3A and FIG. 3B, the tip end portion 9A of the projection portion 9 is provided by a specific part including the center of the sub-raised portion 9D of the projection portion 9 (a front surface portion 9D1 of the sub-raised portion 9D). Note that, in a case where the sub-raised portion 9D is not formed in the projection portion 9, the tip end of the main raised portion 9C of the projection portion 9 and its peripheral part are defined as the tip end portion 9A of the projection portion 9.

(Compression Portion)

A configuration of the tip end portion 9A of the projection portion 9 is not particularly limited. However, a compression portion 16 is preferably formed in the tip end portion 9A. The compression portion 16 is a part where a compression rate of the paper-based sheet 18 for forming the blank material 30 is higher than that in the base end portion 9B. In the example in FIG. 3A and FIG. 3B, the whole part of the projection portion 9 excluding the base end portion 9B and the low-density portion 12 corresponds to the compression portion 16. Thus, in this example, the compression portion 16 is formed at least in the tip end portion 9A. When the compression portion 16 is formed at least in the tip end portion 9A, a state of having stiffness is formed at least in the tip end portion 9A of the projection portion 9 and this makes it unlikely that the projection portion 9 is deformed in a state where the tip end portion 9A is in contact with the outer periphery surface 2A of the main body 2. Thus, it becomes possible to reduce the risk of unnecessarily increasing the contact area between the projection portion 9 and the outer periphery surface 2A of the main body 2 upon deformation of the projection portion 9.
(Thickness of Compression Portion)

A thickness of the compression portion 16 is preferably smaller than that of the base end portion 9B. Such a configuration can be achieved by pressing a part corresponding to the compression portion 16 with a predetermined pressure higher than that of a part corresponding to the base end portion 9B when the paper-based sheet 18 forming the exterior material 3 described below is subjected to emboss processing.
(Flat Surface)

As shown in the example in FIG. 3A and FIG. 3B, a flat surface 17A is preferably formed in the tip end portion 9A of the projection portion 9. Forming the flat surface 17A in the tip end portion 9A makes it easy to stably form a state in which the tip end portion 9A is in contact with the outer periphery surface 2A of the main body 2 when the exterior material 3 is attached to the outer periphery surface 2A of the main body 2. However, the invention is not limited to the case where the tip end portion 9A of the projection portion 9 is provided with the flat surface 17A in the exterior material 3. The tip end portion 9A of the projection portion 9 in the exterior material 3 may be provided with a recessed surface 17B as shown in FIG. 7A or a projected surface 17C as shown in FIG. 7B. FIG. 7A and FIG. 7B are sectional views each illustrating one example of the projection portion 9.
(Slit-Like Structural Portion)

Figure 26:
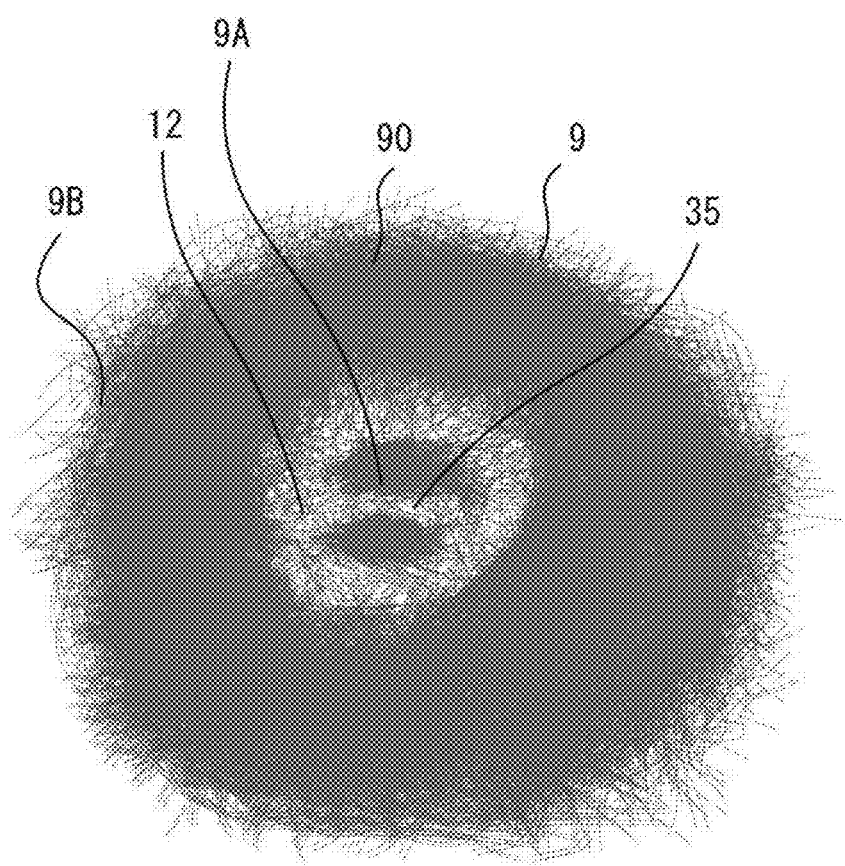
FIG. 26 is an enlarged plan view describing one example of the projection portion of the first embodiment.

A slit-like structural portion 35 may be formed in the tip end portion 9A. The slit-like structural portion 35 is formed by, for example, partially cutting the fibers 18A constituting the paper-based sheet 18 by applying tensile force to the paper-based sheet 18 in the surface direction of the paper-based sheet 18. Note that the slit-like structural portion 35 is a part where the fibers 18 are present to an extent enough to prevent a change in the contour shape of the slit-like structural portion 35 when the tensile force is applied to the paper-based sheet 18 in the surface direction of the paper-based sheet 18. As shown in FIG. 26, the slit-like structural portion 35 may be connected to a low-density portion 12 described below. Note that, in FIG. 26, the slit-like structural portion 35 is formed in a linear shape so as to cross the tip end portion 9A. However, the shape of the slit-like structural portion 35 is not limited thereto.
(Low-Density Portion)

Figure 24:
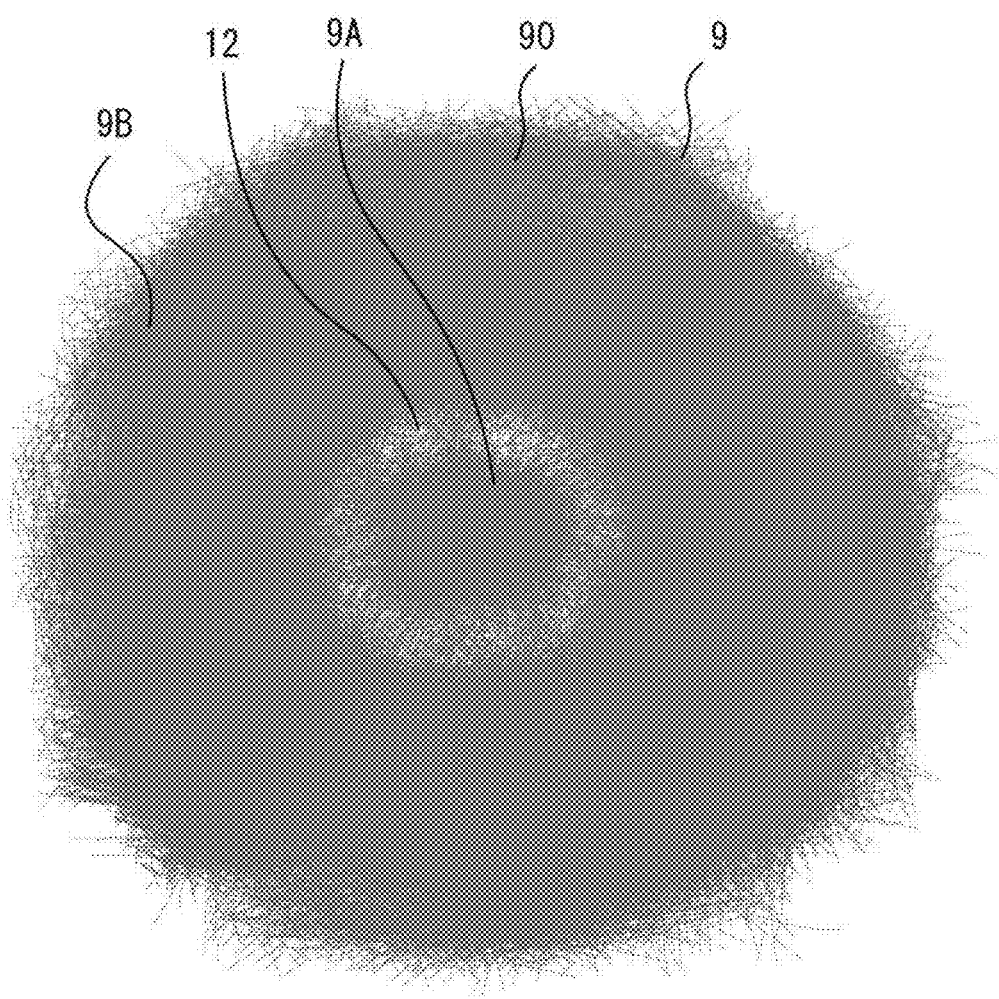
FIG. 24 is an enlarged plan view describing one example of the projection portion of the first embodiment.
Figure 25:
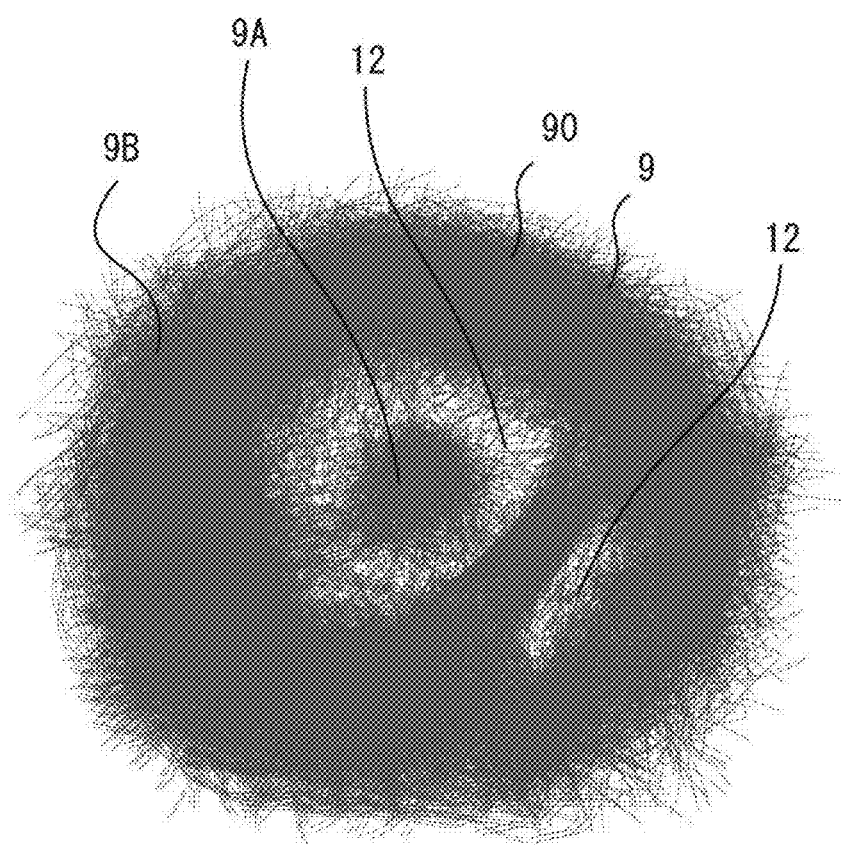
FIG. 25 is an enlarged plan view describing one example of the projection portion of the first embodiment.

As shown in FIG. 3A, FIG. 3B, FIG. 4A, and FIG. 24, at least some of the projection portions 9 among the plurality of the projection portions 9 include the low-density portions 12. The low-density portion 12 can be defined as a part where a density of fibers 18A (a fiber density) forming the paper-based material is smaller than a density of fibers 18A (a fiber density) in the base end portion 9B. The density of the fibers 18A forming the paper-based material represents a density of the fibers 18A constituting the paper-based sheet 18 in a state in which the exterior material 3 is formed. FIG. 4A is a sectional view describing an example of a configuration of the low-density portion 12. FIG. 4A is an enlarged sectional view illustrating a region XS2 surrounded by broken lines in FIG. 3A. FIG. 24 shows one example of the projection portion 9.

The low-density portion 12 is formed at a position between the base end portion 9B and the tip end portion 9A along the projected surface 90 of the projection portion 9. In the example in FIG. 3A and FIG. 4A, the low-density portion 12 is formed at a position closer to the base end portion 9B than an outer peripheral edge of the tip end portion 9A along the projected surface 90 of the projection portion 9, that is, in a side surface portion 9D2 of the sub-raised portion 9D.

The low-density portion 12 preferably has a density smaller than the density of the fibers 18A (the fiber density) in the tip end portion 9A. Further, the low-density portion 12 preferably has a density smaller than the density of the fibers 18A in the peripheral portion 15. However, the low-density portion 12 is a part where a plurality of the fibers 18A is present. Note that, like the slit-like structural portion 35, the low-density portion 12 is preferably a part where the fibers 18 are present to an extent enough to prevent a change in the contour shape of the low-density portion 12 when the tensile force is applied to the paper-based sheet 18 in the surface direction of the paper-based sheet 18. Further, the low-density portion 12 is preferably a part where the fibers 18A are present to an extent enough to prevent the fibers 18A near the contour position of the low-density portion 12 from being displaced from the projected surface 90 of the projection portion 9 toward the outside.

The low-density portion 12 is preferably formed so as to surround the periphery of the tip end portion 9A of the projection portion 9. In the example in FIG. 3B, the low-density portion 12 is formed so as to surround the entire periphery of the tip end portion 9A of the projection portion 9 in the planar view of the blank material 30 of the exterior material 3. For example, as shown in FIG. 24, the low-density portion 12 may be formed in the periphery of the tip end portion 9A in the projection portion 9. However, this does not prohibit that the low-density portion 12 is formed in a part of the periphery of the tip end portion 9A of the projection portion 9. Further, the low-density portions 12 may be formed at mutually different positions along the projected surface 90 of the projection portion 9. For example, as exemplified in FIG. 25, the plurality of the low-density portions 12 may be formed apart from each other at a position near the tip end portion 9A and at a position near the base end portion 9B of the projection portion 9. Further, the low-density portion 12 is not limited to the example in FIG. 4A. For example, as shown in FIG. 4C, the low-density portion 12 may overlap with at least a part of a concealing portion 21.
(Fiber Density)

The fiber density (the density of the fibers 18A) represents a bulk density. The fiber density can be specified by, for example, cutting out a predetermined part of the projection portion 9, measuring a basis weight and a thickness of the cut-out part, and obtaining a value by dividing the basis weight by the thickness (basis weight/thickness).

The cut-out part can be determined depending on the part to be specified. For example, the density of the fibers 18A in the base end portion 9B can be determined by cutting out predetermined parts at a plurality of positions freely selected in the base end portion 9B and obtaining an arithmetic average value of the density of the fibers 18A in the cut-out parts. The density of the fibers 18A in the tip end portion 9A can be determined by cutting out the tip end portion 9A and obtaining the density of the fibers 18A in the cut-out part. Further, the density of the fibers 18A in the peripheral portion 15 can be determined by cutting out predetermined parts at a plurality of positions freely selected in the peripheral portion 15 and obtaining an arithmetic average value of the density of the fibers 18A in the cut-out parts. Note that the method for specifying the fiber density described herein is merely an example, and this does not prohibit using other methods. Other than the above method, it may be specified that the fiber density becomes small by a specifying method such as a measurement of light transmittance. Further, the fiber density may be determined by using an image analyzing apparatus.

(Shape of Low-Density Portion)

A shape of the low-density portion 12 is not particularly limited. However, in FIG. 3B, the low-density portion 12 is formed in a cleft-like shape at a position from the base end portion 9B to the tip end portion 9A of the projection portion 9. Note that the low-density portion 12 being formed in a cleft-like shape means that a part extends in a linear shape in which the fiber sheet 18 is continuously formed according to the visual appearance of the fiber sheet 18 despite that cutting and loosening are formed in the fibers 18A. In this case, the linear shape includes a straight shape, a folded line shape, a curved line shape, and a combination thereof.

(First Portion)

The low-density portion 12 preferably includes a first portion 19. The first portion 19 in the low-density portion 12 is defined as a part where the density of the fibers 18A (the fiber density) constituting the paper-based material forming the projection portion 9 becomes smaller from the tip end portion 9A toward the base end portion 9B. In the example in FIG. 4A, the first portion 19 is formed in the low-density portion 12 at a position closer to an end portion 12A close to the tip end portions 9A.

The decrease in the fiber density can be specified by, for example, dividing the first portion 19 into a plurality of sections of equal size, determining the density of each section, and comparing, among these sections, the densities between the section close to the tip end portions 9A and the position close to the base end portions 9B.

(Second Portion)

The low-density portion 12 preferably includes a second portion 20. The second portion 20 in the low-density portion 12 is defined as a part where the fiber density of the fibers 18A constituting the paper-based material forming the projection portion 9 becomes smaller from the base end portion 9B toward the tip end portion 9A. In the example in FIG. 4, the second portion 20 is formed in the low-density portion 12 at a position closer to an end portion 12B close to the base end portions 9B.

The decrease in the fiber density in the second portion 20 can be specified by, for example, the same manner as in the first portion 19.

(Positional Relationship of First Portion and Second Portion)

The low-density portion 12 is preferably formed such that the first portion 19 and the second portion 20 are connected. That is, the low-density portion 12 preferably has a configuration in which the part in which the fiber density of the fibers 18A constituting the paper-based material becomes smaller from the tip end portion 9A toward the base end portion 9B and the part in which the fiber density of the fibers 18A constituting the paper-based material becomes smaller from the base end portion 9B toward the tip end portion 9A are connected.

Note that a part in which the fiber density is substantially constant may be interposed between the first portion 19 and the second portion 20 in the low-density portion 12. The part in which the fiber density is substantially constant includes a part in which the fiber density is constant and a part in which a variation in the fiber density is smaller than that in the first portion 19 and the second portion 20.

(Non-Facing Surface)

In the example in FIG. 2, FIG. 3A, and FIG. 3B, a recessed surface 91 is formed in a part corresponding to the projected surface 90 of the projection portion 9 on the non-facing surface 3B not facing the outer periphery surface 2A in the exterior material 3 (back surface side). The recessed surface 91 may be formed in a shape corresponding to the projected surface 90 of the projection portion 9. Thus, a plurality of forming regions of the recessed surface 91 is formed on the non-facing surface 3B not facing the outer periphery surface 2A in the exterior material 3. The layout and pitches of the forming regions of the plurality of the recessed surface 91 correspond to the layout and pitches of the projection portions 9. Note that this is merely an example of the non-facing surface 3B, and a projection-like structure may be formed on the non-facing surface 3B.

(Concealing Portion)

The concealing portion 21 is formed in the projection portion 9. The concealing portion 21 conceals at least a part of the outer periphery surface 2A when the exterior material 3 is attached on the outer periphery surface 2A of the main body 2. This configuration includes a case where the concealing portion 21 is formed so as to completely conceal the outer periphery surface 2A from the outside and a case where the concealing portion 21 is formed such that a part or the whole of the outer periphery surface 2A is visible through the concealing portion 21 from the outside. The concealing portion 21 is formed so as to extend in a direction which intersects the thickness direction of the blank material 30 (a direction intersecting the direction S in FIG. 3A) when the blank material 30 forming the exterior material 3 is viewed. The concealing portion 21 extending in the surface direction of the blank material 30 includes a case where the concealing portion 21 extends in parallel with the surface direction of the blank material 30, a case where the concealing portion 21 extends in a direction which obliquely intersects a plane in parallel with the surface direction of the blank material 30, and a combination of these cases. Thus, the concealing portion 21 may be formed in a shape that generally extends in the surface direction of the blank material 30 while being curved or bent in reference to a predetermined position.

In the projection portion 9, the concealing portion 21 is formed at a position closer to the tip end portion 9A than the low-density portion 12. The concealing portion 21 may be formed in a part which includes at least a part of the tip end portion 9A of the projection portions 9. Further, the tip end portion 9A may serve as the concealing portion 21. The concealing portion 21 may be formed in a part which includes the tip end portion 9A. The concealing portion 21 may be formed as a part which includes the tip end portion 9A. In the example in FIG. 3A and FIG. 3B, the tip end portion 9A serves as the concealing portion 21. Note that in the case where the tip end portion 9A includes the concealing portion 21, such a configuration includes a case where, when a gap or a hole is formed in the tip end portion 9A, the tip end portion 9A includes the gap or the hole in addition to the concealing portion 21.

(Formation of Projection Portion)

The projection portion 9 can be formed by subjecting a sheet material (the paper-based sheet 18) forming the exterior material 3 to the emboss processing. In this case, the projection portion 9 is formed as a projected embossed portion, the projected surface 90 is formed on the facing surface 3A, and the recessed surface 91 is formed at a position on the non-facing surface 3B corresponding to the formation part of the projected surface 90. The recessed surface 91 may be formed in a shape corresponding to the projected surface 90.

The sheet material forming the exterior material 3 is not particularly limited as long as it is a sheet using a paper-based material (the paper-based sheet 18) and capable of forming the projection portion 9. It may be a sheet having a flat surface or a sheet having an irregular surface. Examples of the sheet having an irregular surface include a sheet in which a fine wavefront (a wavefront having a height smaller than that of the projection portion 9 (a first projection portion 22 and a second projection portion 23 in the second embodiment described below)) is formed on the surface.

[1-2 Production Method]

Next, a method for producing the container 1 according to the first embodiment will be described.

(Production Steps of Main Body)

Production steps of the container main body (the main body 2) can be formed by a method of processing the blank material (a blank material for a main body) formed by a material according to the material of the main body 2, a method of molding a raw material composition including a material according to the material of the main body 2, or the like. In the method of processing the blank material for the main body, for example, in a case where the main body is formed by the paper-based material, a blank material for a body material in an arch (fan) shape used for forming the body material 4A and a blank material for a bottom surface material in a round shape used for forming the bottom surface material 5A are prepared. The body material 4A can be formed by winding the blank material for the body material in an arch shape and fixing winding ends. A predetermined part from an outer peripheral end to a region slightly inside of the outer peripheral end of the blank material for the bottom surface material in a round shape is subjected to bending processing to the lower side, so that a drooping portion is formed in the outer periphery portion of the blank material for the bottom surface material. In this manner, the bottom surface material 5A is formed. The body material 4A is disposed so as to surround the periphery of the bottom surface material 5A, a lower end of the body material 4A is folded to an inner surface side of the drooping portion of the bottom surface material 5A, and the body material 4A and the bottom surface material 5A are fixed to each other. In this manner, the body portion 4 and the bottom surface portion 5 are formed, and the main body 2 is formed. Note that, if needed, the curled portion 7 may be formed by winding the upper end side of the main body 2 outwardly.

(Production Steps of Exterior Material)

A sheet of a paper-based material (referred to as a "paper-based sheet 18") forming the exterior material 3 is prepared. This paper-based sheet 18 is subjected to the emboss processing to form a structure of the projection portion 9 in the paper-based sheet 18. In this operation, the low-density portion 12 of the projection portion 9 can be formed by setting various conditions such as conditions of the emboss processing and a shape of a die. The low-density portion 12 can be formed by locally loosening the fibers 18A constituting the paper-based sheet 18 in a predetermined part inside the projection portion 9 or locally causing cutting of the fibers 18A in a predetermined part inside the projection portions 9 during the emboss processing. For example, in the step of the emboss processing, a part of the paper-based sheet 18 corresponding to the tip end portion 9A of the projection portion 9 is held in an embossing die before being perforated and the paper-based sheet 18 is further pressed by the embossing die, so that loosening or breaking is caused to at least some of the fibers 18A in a predetermined position closer to the base end portions 9B than the tip end portion 9A in a part corresponding to the projection portions 9, thereby making it possible to create the low-density portion 12. In this step, a part corresponding to a neighboring region of the tip end portion 9A of the projection portion 9 is in surface contact with the paper-based sheet 18 in the embossing die, making it possible to prevent the tip end portion 9A from being perforated during the creation of the low-density portion 12 and to form the concealing portion 21. The concealing portion 21 is preferably formed in a part which includes at least a part of the tip end portion 9A. Then, the paper-based sheet 18 (the embossed sheet) subjected to the emboss processing is cut into a shape corresponding to the shape of the exterior material 3. In this manner, the blank material 30 (the blank material for the exterior material) for forming the exterior material 3 is formed. In the example of the container 1 shown in FIG. 1, the blank material 30 is formed in an arch (fan) shape as shown in FIG. 5A.

The blank material 30 may be directly used as the exterior material 3 or formed in a cylindrical shape and used as the exterior material 3. A combination of the container 1 and the exterior material 3 may be provided to a user. In this case, when the container 1 is used, the exterior material 3 may be appropriately wound on the outer periphery surface 2A of the main body 2 by the user. Further, as described next, the exterior material 3 may be attached to the outer periphery surface 2A of the main body 2 and the resulting product may be provided to a user as a container (a container attached with an exterior material).

(Attachment of Exterior Material to Container)

The blank material 30 is wound around the outer periphery surface 2A of the main body 2. In this operation, the projected surface 90 of the projection portion 9 of the blank material 30 is arranged to face the outer periphery surface 2A of the main body 2. After the blank material 30 is wound around the main body 2, both ends 30A and 30B spaced apart from each other in the winding direction of the blank material 30 are fixed to the main body to form the joint portion 11. Further, another joint portion 11 between the blank material 30 and the main body 2 is formed at a symmetric position with the original joint portion 11 with respect to the central axis of the main body 2. Both joint portions 11 are formed in a linear shape extending in the upper-lower direction. The container 1 is produced in this manner.

[1-3 Action and Effects]

According to the container 1 according to the first embodiment, a plurality of the projection portions 9 is formed in the exterior material 3 and the tip end portions 9A of the projection portions 9 face the outer periphery surface 2A of the main body 2. The low-density portions 12 are formed in the projection portions 9. Thus, when the container 1 is filled with a content having a high temperature, even if heat is transmitted from the body portion 4 of the main body 2 to the tip end portion 9A of the projection portion 9, the heat of the tip end portions 9A hardly travels through the fiber sheet 18 and reaches the base end portions 9B of the projection portion 9 via the fibers 18A because of the low-density portion 12 formed between the tip end portion 9A and the base end portion 9B of the projection portion 9. Further, the tip end portion 9A being in contact with the main body 2 makes the contact area between the exterior material 3 and the main body 2 small. This makes it difficult for the heat to transmit from the main body 2 to the exterior material 3. Further, the projection portion 9 can function as a spacer for forming the gap 27 between the main body 2 and the exterior material 3. This makes it possible to form an air layer in the gap 27 between the main body 2 and the exterior material 3 and obtain a heat conduction reduction effect also by the air layer.

Figure 22:
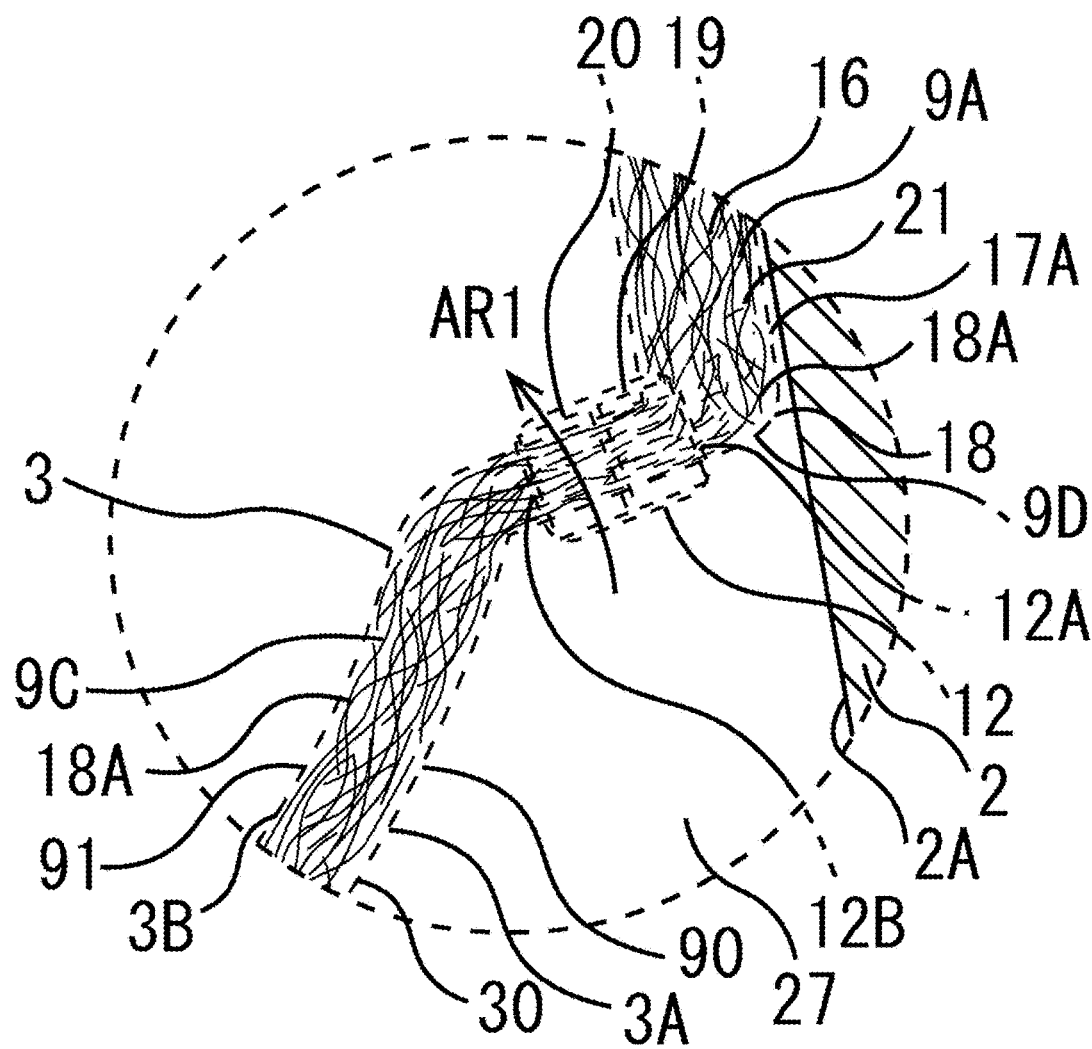
FIG. 22 is a sectional view describing action and effects of the container of the first embodiment.
Figure 23:
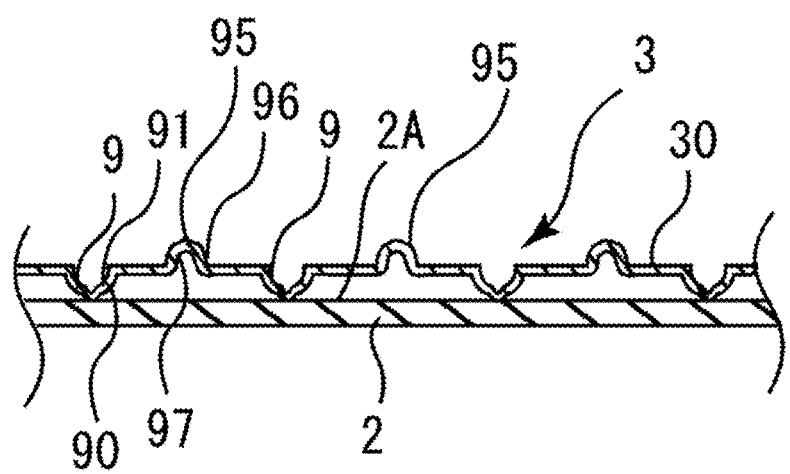
FIGS. 23A and 23B each shows a sectional view of a main part describing a container of a fourth embodiment.
Figure 23:
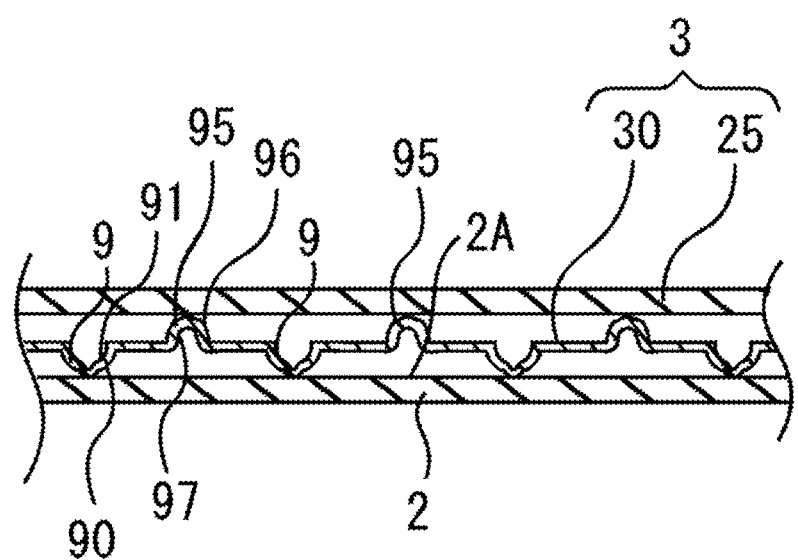

Further, in the exterior material 3 used in the first embodiment, the low-density portion 12 is formed closer to the base end portion 9B than the concealing portion 21, thus, at least a part of the low-density portion 12 is prevented from being in contact with the outer periphery surface 2A of the main body 2, and a part of the low-density portion 12 can face the gap 27. When the air layer in the gap 27 is warmed up in the container 1, as shown in FIG. 22, the heat can be gradually diffused to the exterior material 3 in a direction from the low-density portion 12 to the outside (a direction of an arrow AR1) in the part of the low-density portion 12, making it possible to gradually release the air included in the warmed air layer to the outside. It is speculated that this also makes it possible to reduce a temperature rise in the exterior material 3. Note that FIG. 22 is a sectional view describing a state in which the projection portion 9 of the exterior body 3 is in contact with the main body 2 of the container 1. Further, at least a part of the low-density portion 12 can be prevented from being in contact with the outer periphery surface 2A of the main body 2, making it possible to prevent the fibers 18 of the low-density portion 12 from being in contact with the container 1 over a wide area even if pressing force is applied from the outside of the exterior material 3 toward the main body 2 and thus reduce the contact area between the fibers 18 positioned at an inner side when viewed from the thickness direction of the exterior body 3 and the main body 2.

Further, when the container 1 is filled with a content having a low temperature (a cold content), even if the tip end portion 9A of the projection portion 9 is cooled by the body portion 4 of the main body 2, the coldness of the tip end portion 9A hardly reaches the base end portion 9B of the projection portion 9 via the fibers 18A because of the low-density portion 12 formed from the tip end portion 9A to the base end portion 9B of the projection portion 9. Further, the tip end portion 9A of the projection portion 9 of the exterior material 3 being in contact with the main body 2 makes the contact area between the exterior material 3 and the main body 2 small. This prevents the exterior material 3 from being cooled. Further, the exterior material 3 is also prevented from being cooled by a heat insulation effect provided by the air layer formed in the gap 27 between the main body 2 and the exterior material 3. Thus, dew condensation is hardly formed on the surface (the non-facing surface not facing the outer periphery surface of the main body) of the exterior material 3.

[1-4 Exemplary Modification] Next, exemplary modifications will be described in detail.

(Exemplary Modification 1)

Figure 8:
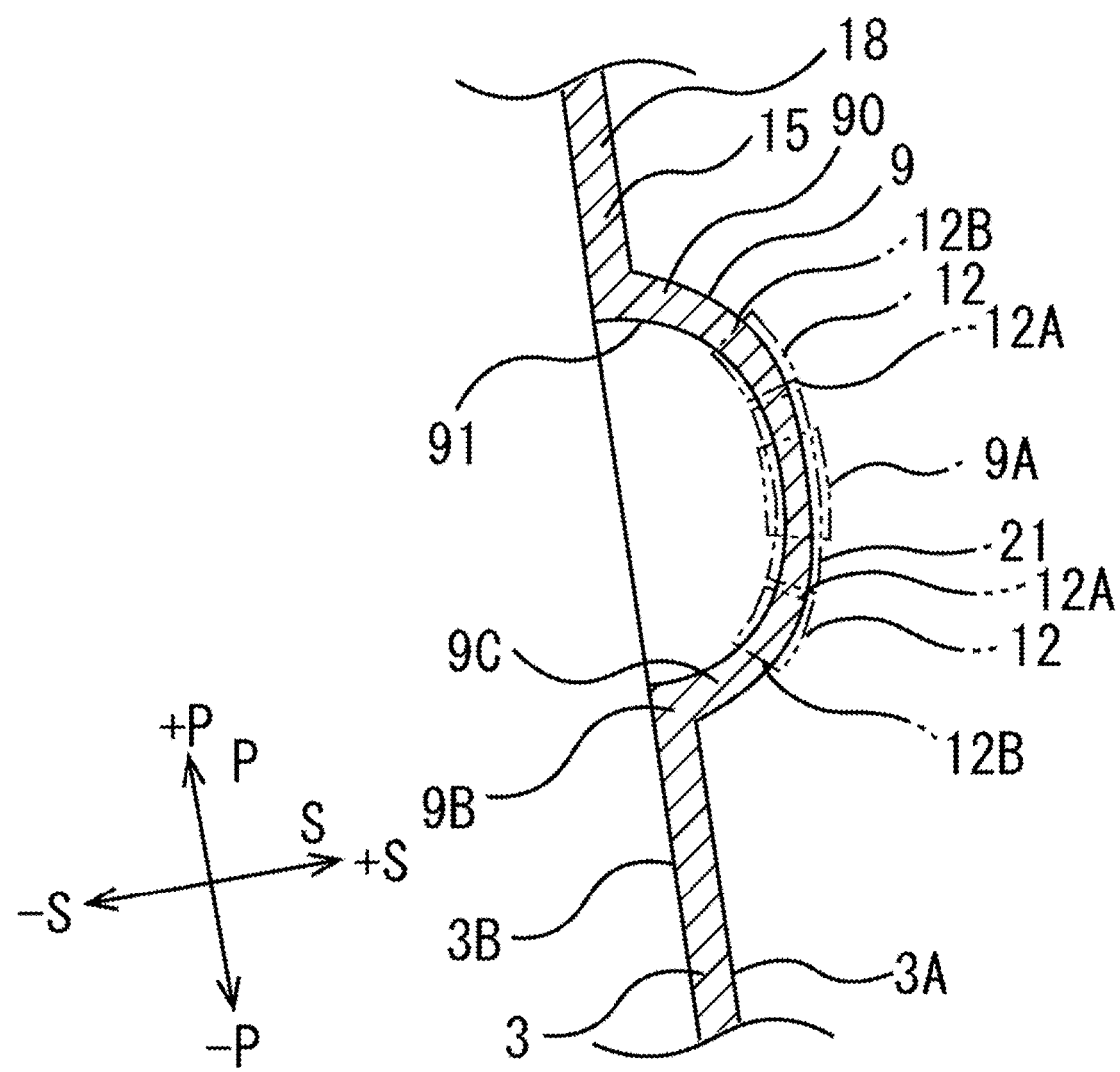
FIG. 8 shows an enlarged sectional view describing one example of the projection portion of the first embodiment.

In the description of the first embodiment, the projection portion 9 includes the sub-raised portion 9D. However, as shown in FIG. 8, the sub-raised portion 9D may be omitted in the projection portion 9 (exemplary modification 1). FIG. 8 is a sectional view illustrating an example of the projection portion 9 of the container 1 according to the exemplary modification 1. In the exemplary modification 1, the sub-raised portion 9D is omitted in the projection portion 9. Other configurations are the same as in the above first embodiment, and description thereof will be omitted.

In the exemplary modification 1, the main raised portion 9C forms the projection portion 9. Further, the tip end portion 9A is formed in a predetermined range including a projection end of the main raised portion 9C. In the example in FIG. 8, a part including the tip end portion 9A constitutes the concealing portion 21 and the low-density portion 12 is formed around the concealing portion 21.

(Exemplary Modification 2)

In the container 1 according to the first embodiment, a slit portion 34 may be formed closer to the base end portion 9B than the tip end portion 9A of the projection portion 9 in the exterior material 3 (exemplary modification 2).

(Slit Portion)

In the exemplary modification 2 of the first embodiment, the slit portion 34 may be formed closer to the base end portion 9B than the low-density portion 12 of the projection portion 9, formed so as to intersect with the low-density portion 12, or formed closer to the tip end portion 9A than the low-density portion 12. Further, the slit portion 34 may be formed so as to merge with the low-density portion 12. The slit portion 34 may be present inside the formation region of the low-density portion 12.

(Formation Method of Slit Portion)

When the projection portion 9 is formed by the emboss processing, the paper-based sheet 18 is pressed so as to cause rapture to the plurality of the fibers 18A in a part corresponding to the projection portion 9 of the paper-based sheet 18, and at least some of the raptured fibers 18A are separated from each other. In this operation, among the parts where the rapture is caused to the fibers 18A in the part corresponding to the projection portion 9, a part of the paper-based sheet 18 closer to the base end portion 9B than the tip end portion 9A is raptured. The low-density portion 12 is formed in a part where the rapture is not caused in the paper-based sheet 18. In this manner, the slit portion 34 is formed in the projection portion 9.

2 Second Embodiment

A container according to the second embodiment will be described.

[2-1 Configuration]

As shown in FIG. 9 to FIG. 12, the container 1 according to the second embodiment includes the projection portion 9 in the first embodiment as a first projection portion 22. Further, in the second embodiment, the exterior material includes a second projection portion 23 described below. Except for the first projection portion 22 and the second projection portion 23, other configurations in the second embodiment are the same as in the first embodiment, thus description thereof will be omitted. FIG. 9 is a perspective view illustrating one example of the container 1 according to the second embodiment. FIG. 10 shows a sectional view illustrating one example corresponding to a cross section taken along B-B line in FIG. 9, showing the container 1 according to the second embodiment. Note that, in FIG. 9 and FIG. 10, layouts of the first projection portion 22 and the second projection portion 23 do not completely match for convenience of description. FIG. 11A is a plan view illustrating an example of a blank material 31 forming the exterior material 3. FIG. 11B is a plan view describing an example of the first projection portion 22 and the second projection portion 23. FIG. 12A is a sectional view describing an example of the first projection portion 22 and the second projection portion 23. FIG. 12B is a sectional view describing an example of the second projection portion 23.

(First Projection Portion)

As shown in FIG. 9 and FIG. 10, the first projection portion 22 is configured in the same manner as the projection portion 9 in the first embodiment as described above except that it is connected to the second projection portion 23. Note that, in the FIG. 9 and FIG. 10, a reference sign 92A represents a projected surface of the first projection portion 22 and a reference sign 92B represents a recessed surface of the first projection portion 22. A reference sign 22A represents a tip end portion of the first projection portion 22 and a reference sign 22B represents a base end portion of the first projection portion.

(Second Projection Portion)

The exterior material 3 includes a plurality of the second projection portions 23. Like the first projection portions, the second projection portions 23 protrude from the facing surface 3A facing the outer periphery surface 2A. As shown in FIG. 9 and FIG. 11B, the second projection portions are formed so as to connect at least two different first projection portions 22. In the example in FIG. 9 and FIG. 11B, they are formed so as to connect two different first projection portions 22 adjacent to each other. Note that, in the FIG. 9 and FIG. 10, a reference sign 93A represents a projected surface of the second projection portion 23 and a reference sign 93B represents a recessed surface of the second projection portion 23. A reference sign 23A represents a tip end portion of the second projection portion 23 and a reference sign 23B represents a base end portion of the second projection portion.

In this description, the one first projection portion 22 adjacent to a given first projection portion 22 refers to the first projection portion 22 directly facing the given first projection portion 22 in a state where the exterior material 3 is extended into a plane as a blank material 31 as shown in FIG. 11A. FIG. 11A is a plan view illustrating an example of the blank material 31. Note that the blank material 31 is an embossed sheet like the blank material 30 described in the first embodiment. The blank material 31 may be the same as the blank material 30 except that the first projection portion 22 and the second projection portion 23 are formed.

(Shape of Second Projection Portion)

In the example in FIG. 9, FIG. 10, FIG. 11A, and FIG. 11B, the second projection portion 23 is formed in a chevron shape in cross-section as shown in FIG. 12B. FIG. 12B shows a state of a vertical section taken along C-C line in FIG. 11A and is a sectional view illustrating one example of the second projection portion 23. Note that the shape of the second projection portion 23 is not limited to the example in FIG. 12B and may be other shapes. For example, the second projection portion 23 may be formed in a U-shape in cross-section, a rectangular shape in cross-section, a trapezoidal shape in cross-section, an irregular shape, or the like. However, from the standpoints of stability of the shape of the exterior material 3, easiness in the emboss processing, and designability, the second projection portion 23 is preferably formed in a chevron shape in cross-section.

(Height of Second Projection Portion)

As shown in FIG. 12A, a height (H2) of the second projection portion 23 is formed to be smaller than a height (H1) of the first projection portion 22. In this manner, when the exterior material 3 is attached to the outer periphery surface 2A of the main body 2, it becomes possible that the tip end portion 9A of the first projection portion 22 is in contact with the main body 2 and the second projection portion 23 is apart from the outer periphery surface 2A of the main body 2. The height of the second projection portion 23 being formed to be smaller than that of the first projection portion 22 in this manner can reduce the risk of excessively increasing the contact area between the exterior material 3 and the outer periphery surface 2A of the main body 2 and maintain the heat insulation property of the exterior material 3. In FIG. 12A, a position of the outer periphery surface 2A of the main body 2 is indicated by broken lines when the exterior material 3 is imaginary attached to the outer periphery surface 2A of the main body 2.

(Combined Structure Portion)

As described above, the first projection portion 22 and the second projection portion 23 are formed in the exterior material 3, thereby forming a combined structure portion 24 as shown in FIG. 9 and FIG. 10. The combined structure portion 24 represents a structural unit formed by a combination of the first projection portion 22 and the second projection portion 23 connected to the first projection portion 22.

Figure 11:
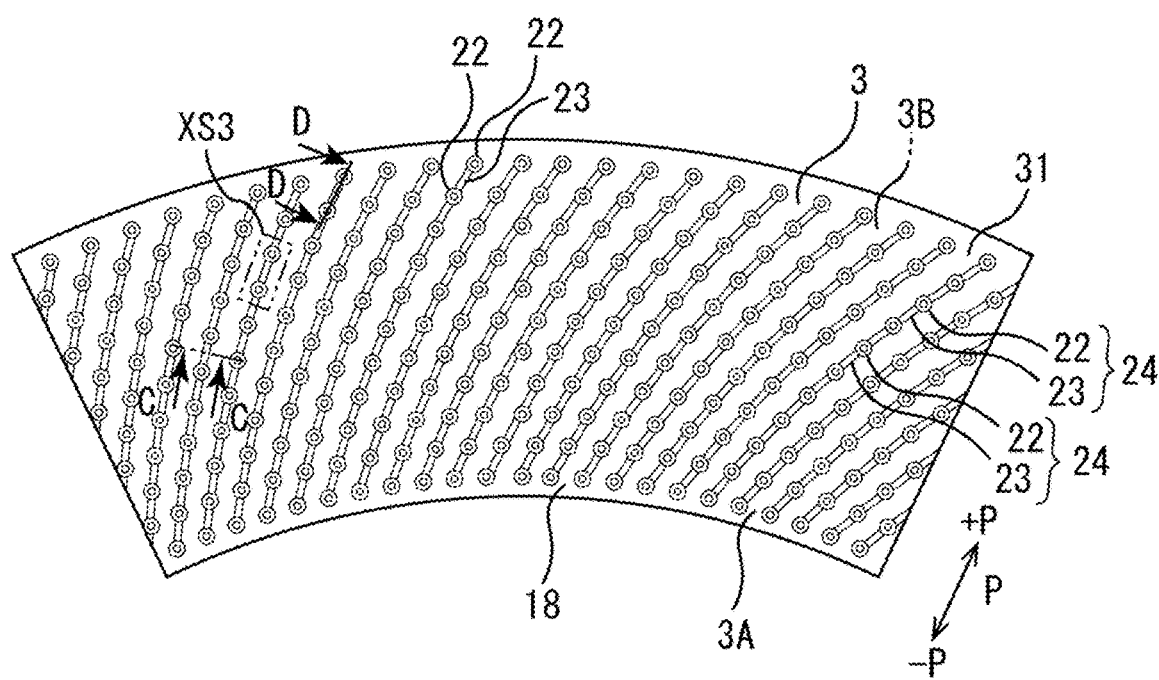
FIG. 11A is a plan view illustrating a blank material for an exterior material of the second embodiment.
FIG. 11B is an enlarged plan view describing one example of a first projection portion and a second projection portion of the second embodiment. Further.
Figure 11:
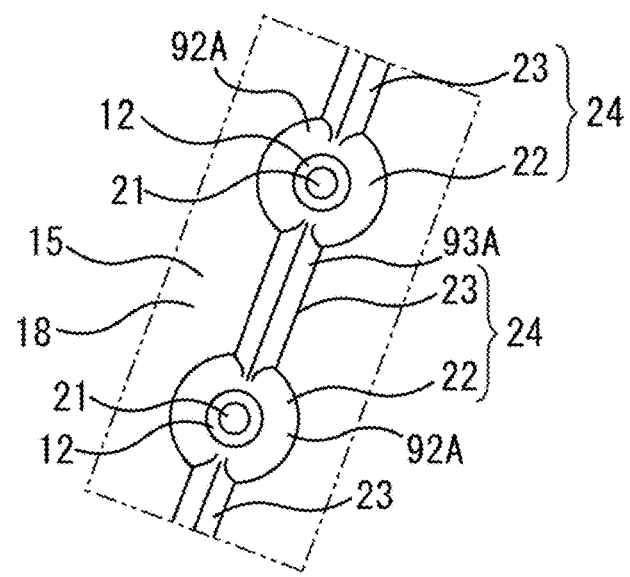
Figure 12:
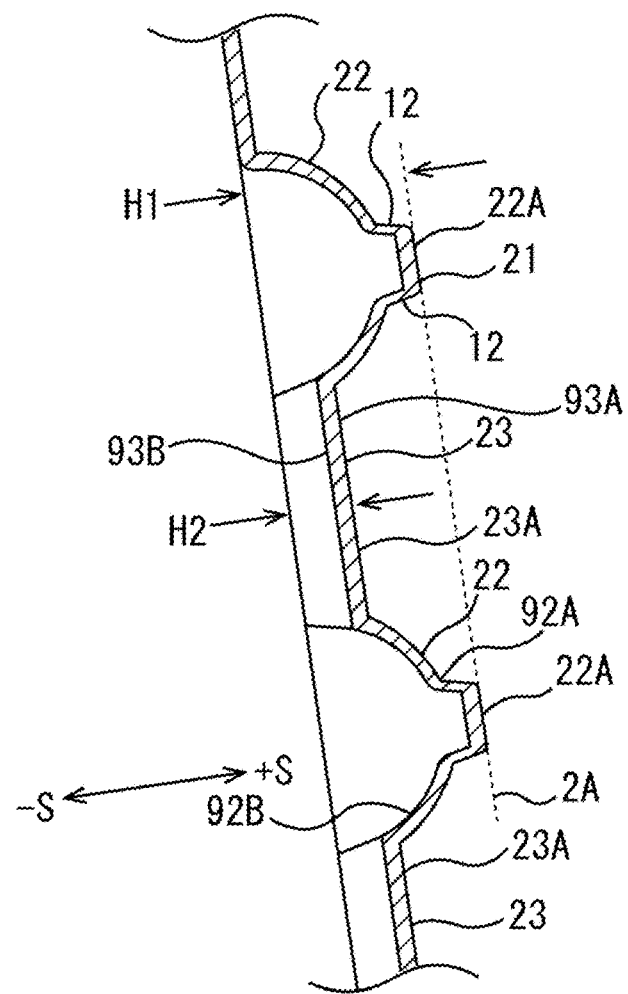
FIG. 12A is an enlarged sectional view describing one example of the first projection portion and the second projection portion of the second embodiment. Further.
FIG. 12B is an enlarged sectional view describing one example of the second projection portion of the second embodiment. Further.
Figure 12:
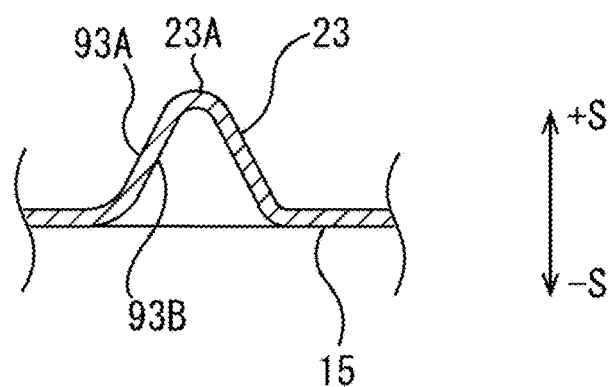

In the example in FIG. 9, FIG. 10, and FIG. 11A, a plurality of the combined structure portions 24 is continuously (connectively) formed. In particular, in the example in FIG. 11, a structure in which a plurality of the combined structure portions 24 are continuously arranged is formed so as to obliquely cross a direction of an arrow P representing a direction extending from an upper end to a lower end of the exterior material 3 when the blank material 31 is formed into the exterior material 3. The example in FIG. 11 is merely an example and a layout of the combined structure portion 24 is not limited to this example. For example, the structure in which a plurality of the combined structure portions 24 is continuously arranged is formed in parallel with the direction of the arrow P. Further, the combined structure portions 24 may be discontinuously formed.

(Formation of First Projection Portion and Second Projection Portion)

Like the projection portion 9 in the first embodiment, the first projection portion 22 can be formed as an embossed portion (a first projected embossed portion) by the emboss processing. The second projection portion 23 can be formed as an embossed portion (a second projected embossed portion) formed by the emboss processing. The second projection portion 23 may be integrally formed with the first projection portion 22 when the first projection portion 22 is formed by the emboss processing. Further, the first projection portion 22 and the second projection portion 23 may be individually subjected to the emboss processing.

[2-2 Action and Effects]

According to the container 1 according to the second embodiment, the same effects as the first embodiment can be obtained by forming the first projection portion 22.

According to the container 1 according to the second embodiment, the shape of the exterior material 3 can be stabilized by forming the second projection portion 23. According to the container 1 according to the second embodiment, even if a force is applied from the side of the non-facing surface 3B of the exterior material 3 to the side of the facing surface 3A, formation of the second projection portion 23 makes it unlikely that the exterior material 3 is deformed so as to further protrude on the side of the facing surface 3A, thus the risk of the peripheral portion 15 of the exterior material 3 being in contact with the outer periphery surface 2A of the main body 2 can be reduced. Note that the second projection portion 23 protrudes from the facing surface 3A. Thus, a separation distance between the exterior material 3 and the outer periphery surface 2A becomes smaller at the formation position of the second projection portion 23 as compared with a case where the second projection portion 23 is not formed. However, in the second embodiment, the second projection portion 23 is formed so as to connect two different first projection portions 22. Thus, the exterior material 3 is hardly deformed and the risk of the peripheral portion 15 being in contact with the outer periphery surface 2A is reduced.

[2-3 Exemplary Modification]
(Exemplary Modification 1)

Figure 17:
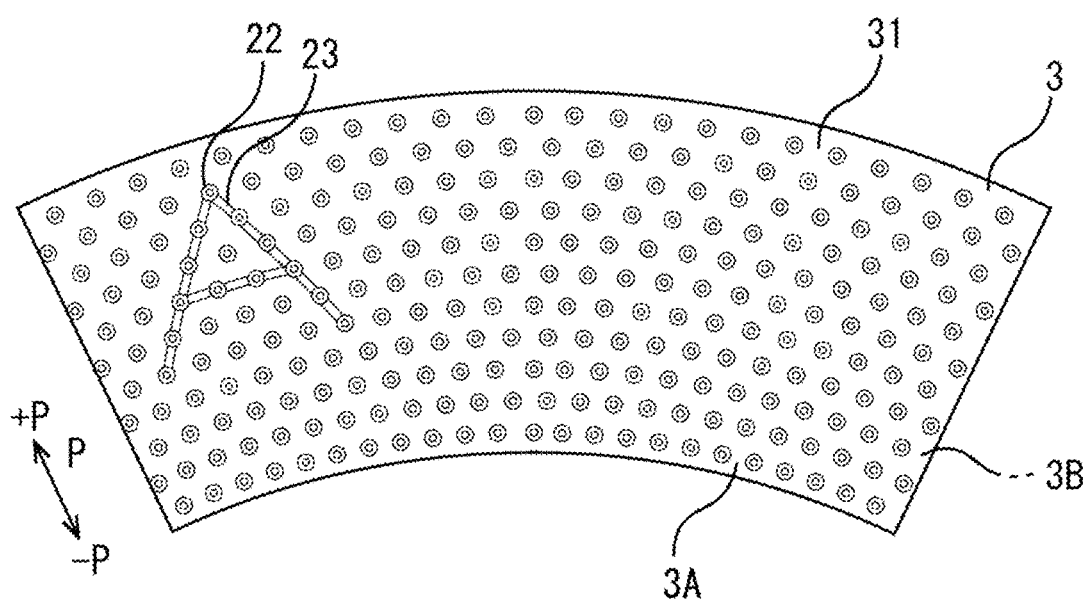
FIG. 17 is a plan view describing an exemplary modification of the second embodiment.
Figure 17:
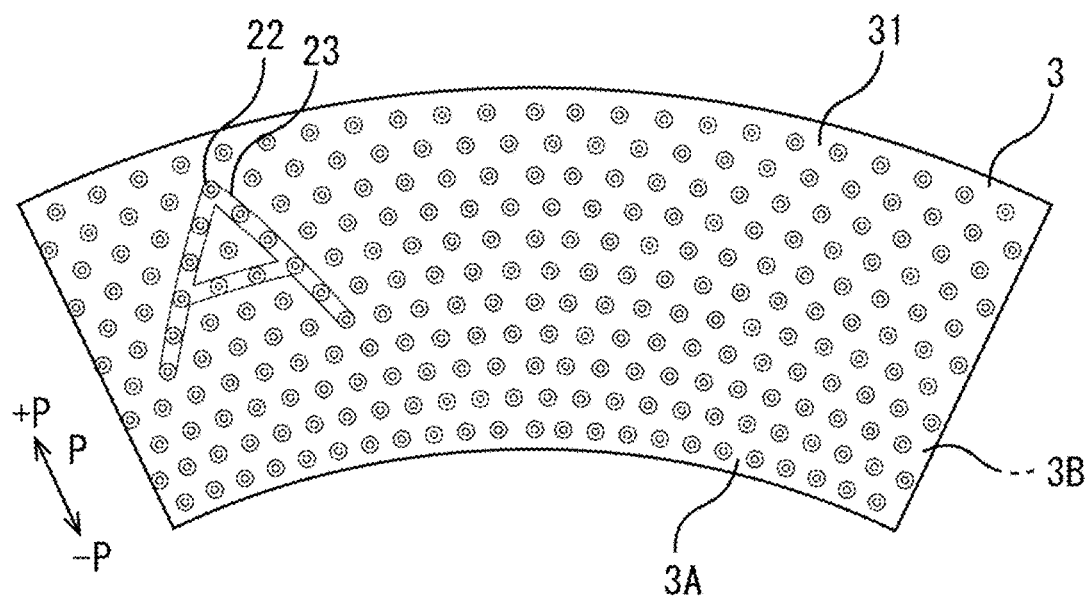
Figure 18:
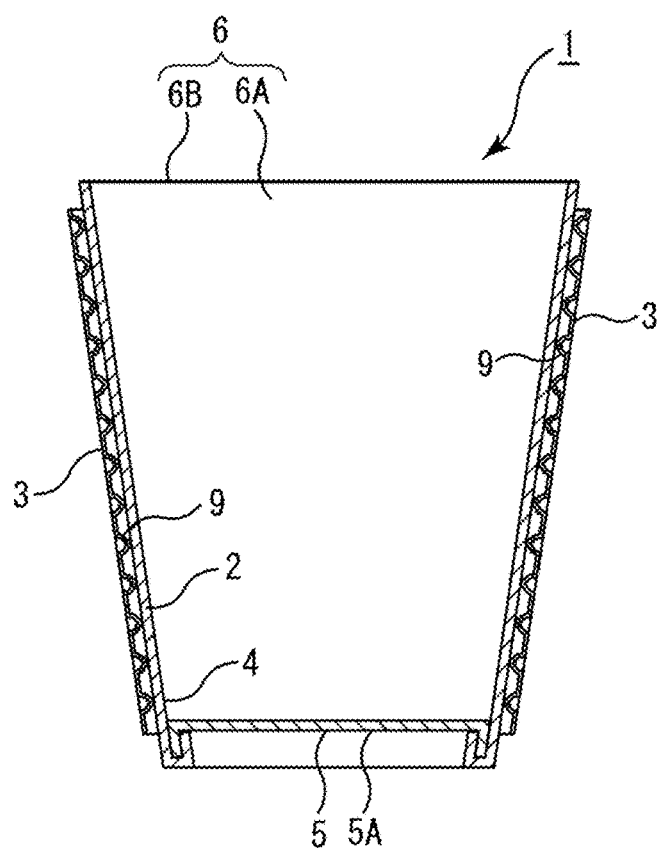
FIGS. 18A and 18B each shows a sectional view describing one example of a container main body.
Figure 18:
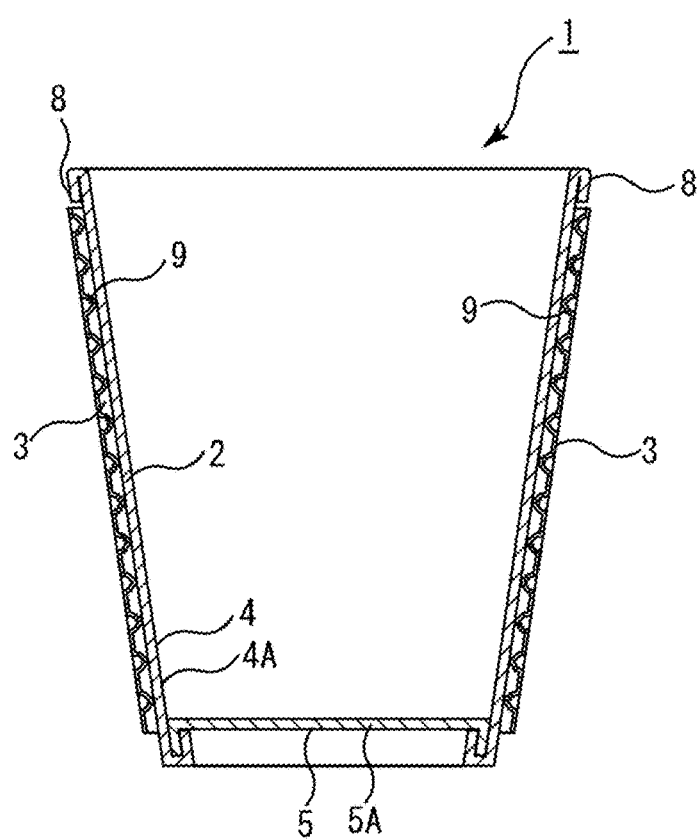
Figure 19:
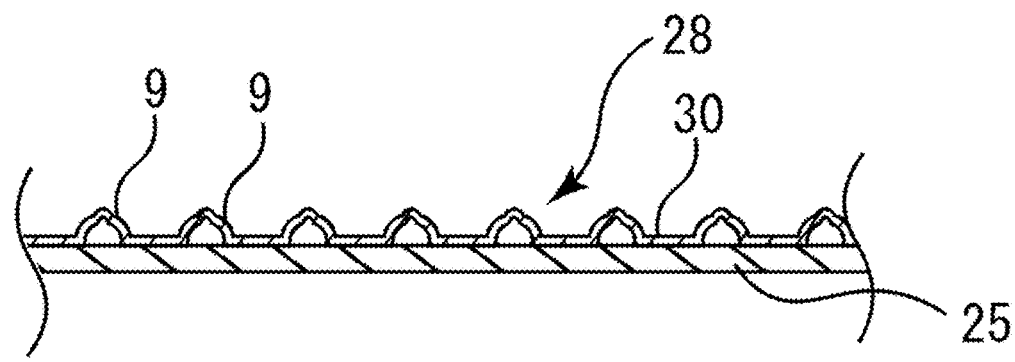
FIGS. 19A and 19B each shows a sectional view illustrating one example in which an exterior body is used as a heat insulation sheet.
Figure 19:
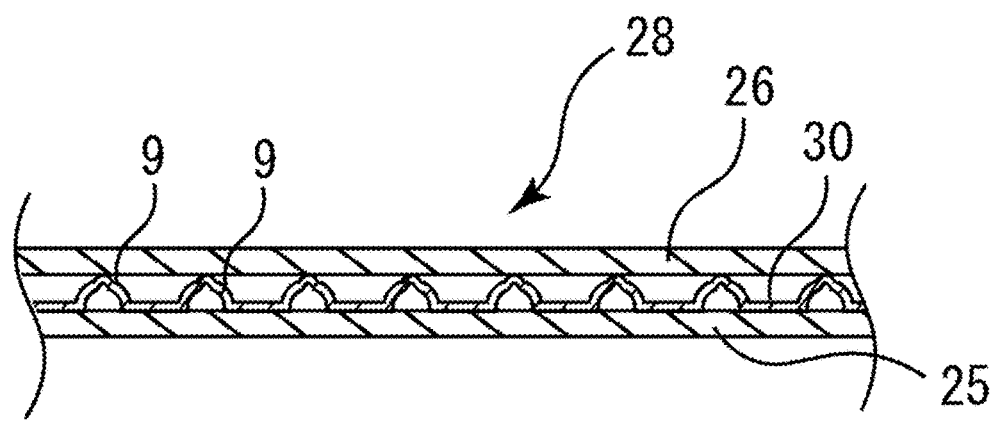

In the second embodiment, the layout of the second projection portion 23 is not limited to the above layout. As shown in the example in FIG. 17, the layout of the second projection portion 23 may be determined such that a plurality of the second projection portions 23 displays one letter or pattern (this mode is referred to as an "exemplary modification 1 of the second embodiment"). FIG. 17 is a diagram illustrating one example of the layout of the second projection portion 23 formed in the exterior material 3 of the container 1 according to the exemplary modification of the second embodiment. In the example in FIG. 17, the layout of the second projection portion 23 is determined so as to display a capital letter of alphabet "A".

(Exemplary Modification 2)

Figure 20:
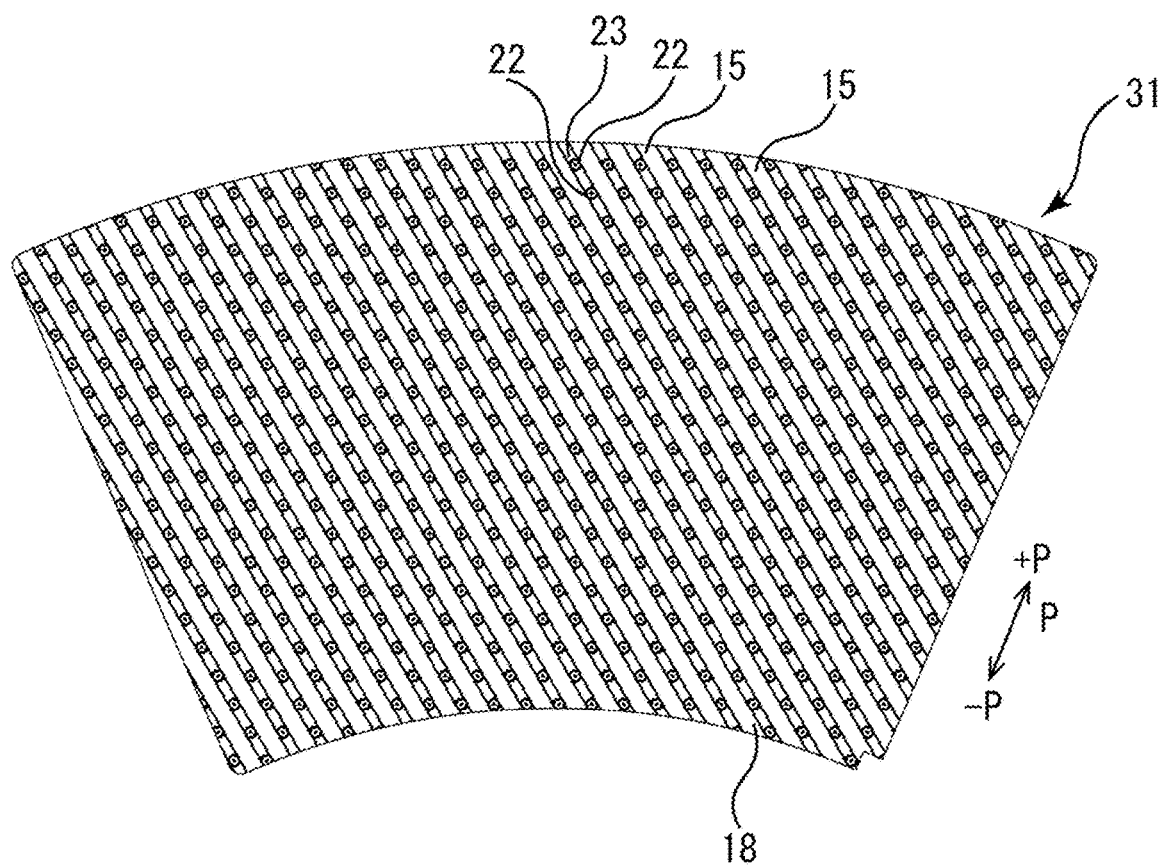
FIG. 20 shows a plan view describing one example of a blank material for an exterior material of an exemplary modification 2 of the second embodiment.
Figure 21:
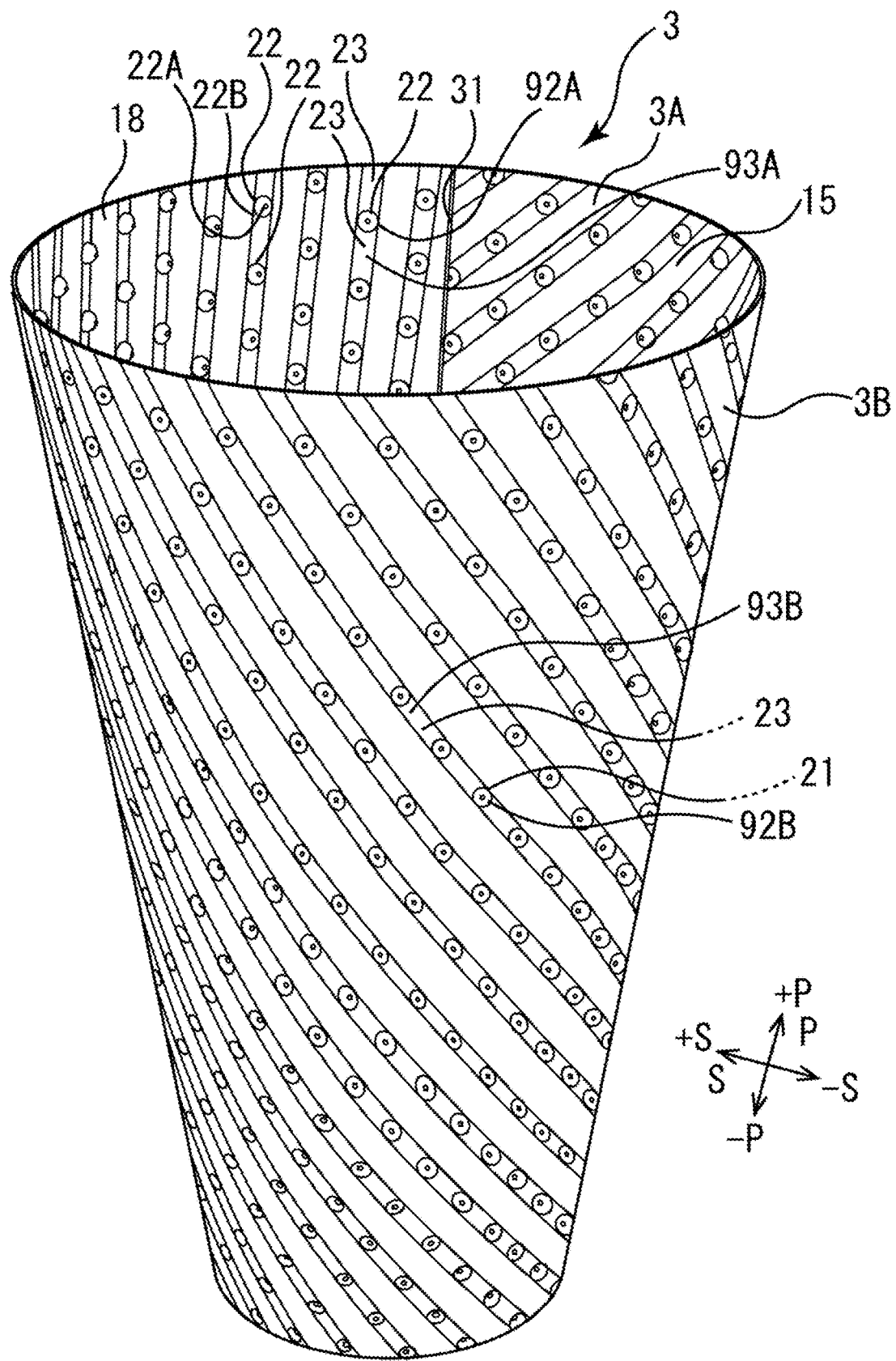
FIG. 21 is a perspective view describing one example of an exterior body of the exemplary modification 2 of the second embodiment.

In the second embodiment, the layout of the first projection portion 22 and the second projection portion 23 is not limited to the above layout. As shown in FIG. 20 and FIG. 21, the layout may be designed such that the first projection portions 22 are formed on the second projection portions 23 (exemplary modification 2). FIG. 20 shows an exploded plan view describing one example of the blank material 31 forming the exterior material 3 of the container 1 according to the second embodiment. FIG. 21 is perspective view describing one example of the exterior material 3 obtained by forming the blank material 31 into a cylindrical shape.

(First Projection Portion)

A shape of the first projection portion 22 is formed so as to further protrude from the top of the second projection portion 23 in the same direction as a protrusion direction of the second projection portion (a direction of an arrow +S in FIG. 21). Thus, the base end portion 22B of the first projection portion 22 is positioned on the second projection portion 23 and the tip end portion 22A of the first projection portion 22 is formed at a position further protruding from the top of the second projection portion 23.

(Second Projection Portion)

A shape of the second projection portion 23 is formed so as to extend in a belt shape in a direction obliquely crossing a direction of an arrow P as shown in FIG. 20, and a plurality of the second projection portions 23 are formed so as to be arranged with a spacing. Each second projection portion 23 connects the adjacent first projection portions 22, and a plurality of the first projection portions 22 is formed on the upper side of the second projection portion 23 (projected surface 93A side) along a longitudinal direction of the second projection portion 23. In this configuration, the plurality of the first projection portions 22 is aligned at a predetermined interval on the upper side of the second projection portion 23. The interval of the adjacent first projection portions 22 may be constant or varied.

(Shape of Second Projection Portion)

In the example in FIG. 20 and FIG. 21, the second projection portion 23 is formed in a trapezoidal shape in cross-section. Note that the shape of the second projection portion 23 is not limited to the example in FIG. 20 and FIG. 21, and other shapes may be employed.

(Height of Second Projection Portion)

A height of the second projection portion 23 (a height difference from the peripheral portion 15 to a tip end portion 23A) is not particularly limited. In the exemplary modification 2, regardless of the height of the second projection portion 23, it is formed to be smaller than a height of the first projection portion 22 (a height difference from the peripheral portion 15 to the tip end portion 22A).

(Exemplary Modification 3)

In the exemplary modification 2 of the second embodiment, the shape of the second projection portion 23 is not limited to the example shown in FIG. 20 and FIG. 21. For example, as shown in FIG. 17B, the second projection portion 23 may be formed in a shape imitating a letter, a picture, or the like. FIG. 17B is a plan view describing one example of the blank material 31 in which the second projection portions 23 form a shape imitating a capital letter of alphabet "A".

3 Third Embodiment

A container 1 according to the third embodiment will be described.

[3-1 Configuration]

Figure 15:
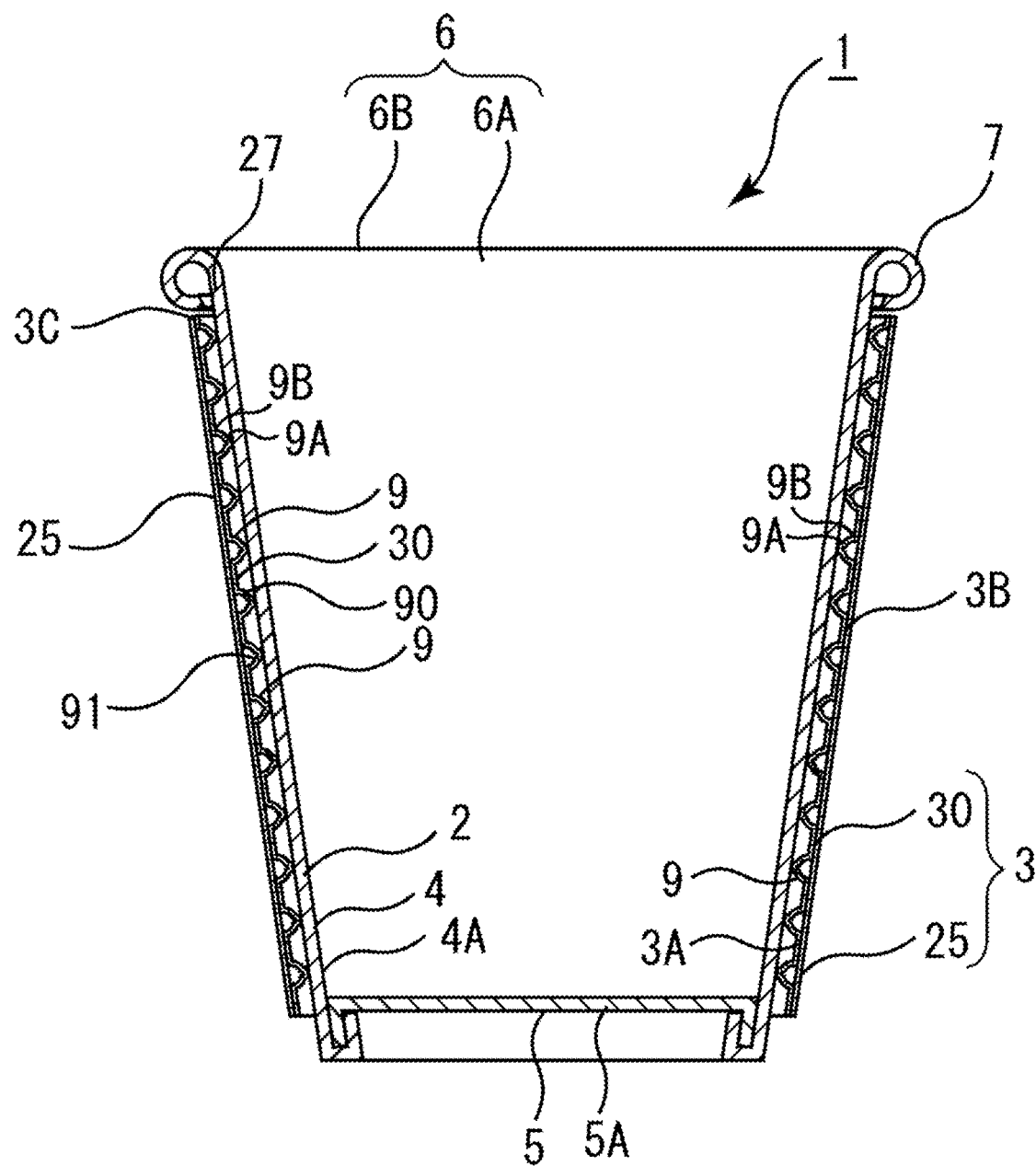
FIG. 15 is a sectional view describing one example of a third embodiment.

As shown in FIG. 15, the container 1 according to the third embodiment has a configuration in which a protection material 25 is laminated on the non-facing surface 3B not facing the outer periphery surface 2A among the surfaces of the exterior material 3 in the first embodiment. Except for the protection material 25, other configurations in the third embodiment are the same as in the first embodiment, thus description thereof will be omitted. FIG. 15 is a sectional view describing one example of the container according to the third embodiment. FIG. 15 shows a case where the protection material 25 is laminated on the outermost surface of the exterior material 3 of the container according to the first embodiment.

The container 1 according to the third embodiment is not limited to the example in FIG. 15. The container 1 according to the third embodiment may have a configuration in which the protection material 25 is laminated on the non-facing surface 3B of the exterior material 3 in the second embodiment. In this case, except for the protection material 25, other configurations in the third embodiment are the same as in the second embodiment, thus description thereof will be omitted.

(Protection Material)

As the protection material 25, a paper-based sheet similar to the paper-based sheet 18 for forming the blank material for the exterior material described in the first embodiment may be adopted. Further, the protection material 25 may be a non-paper sheet. Examples of the non-paper sheet include a resin film or the like.

The exterior material 3 of the container 1 according to the third embodiment can be produced by boding the protection material 25 to a surface of the embossed sheet used in the first embodiment or the second embodiment (e.g., the blank material 30 and the blank material 31) which is to become the non-facing surface 3B not facing the outer periphery surface 2A. As a bonding method, boding using an adhesive, a method of using heat sealing, or the like can be appropriately used.

[3-2 Action and Effects]

According to the container 1 according to the third embodiment, the same effects as the first embodiment can be obtained by forming the projection portion 9 in the exterior material 3.

Further, in the third embodiment, providing the protection material 25 to the exterior material 3 makes it possible to reduce the exposure of the recessed surface 91 corresponding to the projected surface 90 of the projection portion 9 formed by the emboss processing and makes it easy to apply printing to an outside surface (an exposed surface) of the exterior material 3, allowing designability of the container 1 to improve.

Further, the embossed sheet laminated with the protection material 25 makes it possible to stabilize the shape of the base end portion 9B of the projection portion 9 and reduce deformation of the projection portion 9, which makes it less likely that the projection portion 9 is crushed.

Even when the first projection portion 22 and the second projection portion 23 are formed in the exterior material 3 in the container 1, the same effects as in the above description of the action and effects of the third embodiment can be obtained.

4 Fourth Embodiment

A container 1 according to the fourth embodiment will be described.

[4-1 Configuration]

As shown in FIG. 23A, the container 1 according to the fourth embodiment has a configuration in which at least one projection portion 95 is formed, the projection portion 95 protruding from the non-facing surface 3B not facing the outer periphery surface 2A among the surfaces of the exterior material 3 in the first embodiment. Except for the projection portion 95 protruding from the non-facing surface 3B, other configurations in the fourth embodiment are the same as those in the first embodiment, thus description thereof will be omitted. FIG. 23A is an enlarged schematic sectional view of a main part describing one example of the container 1 according to the fourth embodiment. FIG. 23A shows a case in which a plurality of the projection portions 95 projecting from the non-facing surface 3B is formed in the exterior material 3 of the container according to the first embodiment.

(Projection Portion Projecting from Non-Facing Surface 3B)

The projection portion 95 protrudes from the non-facing surface 3B not facing the outer periphery surface 2A and forms a projected surface 96 on the non-facing surface 3B. In the example in FIG. 23A, a plurality of the projection portions 95 is formed. The shape of the projection portion 95 is not particularly limited. As shown in the example in FIG. 23A, the projection portion 95 may be formed in a substantially dome shape, a conical shape, or a columnar shape. A shape of the projected surface 96 of the projection portion 95 and the shape of the projected surface 90 of the projection portion 9 may be the same or different from each other. Further, like the projection portion 9, the projection portion 95 may have a structure corresponding to the low-density portion 12. The exterior body 3 may be recessed in the thickness direction of the exterior body 3 (the direction S in FIG. 23A) at a position on the facing surface 3A corresponding to the projection portion 95 to form a recessed surface 97 at the recessed part. Note that, in FIG. 23A, the exterior material 3 is recessed at a position on the non-facing surface 3A corresponding to the projection portion 9 to form the recessed surface 91 at the recessed part in the same manner as in each example described in the first to the third embodiments. The shape of the recessed surface 97 and the recessed surface 91 may be substantially the same or different from each other.

As shown in FIG. 23A, the projection portion 95 is preferably formed at a position away from the position overlapping with the projection portion 9 (a position not overlapping with the projection portion 9). This can be achieved by developing the blank material 30 forming the exterior body 3 to a flat state and forming the projection portion 9 and the projection portion 95 at different positions when viewed from a direction along the thickness direction of the exterior body 3.

[4-2 Action and Effects]

According to the container 1 according to the fourth embodiment, the same effects as those of the first embodiment can be obtained by forming the projection portion 9 in the exterior material 3.

Further, according to the fourth embodiment, it can be expected that forming the plurality of the projection portions 95 makes it possible to prolong the time in which heat conducted from the projection portions 9 is conducted to the tip end of the projection portions 95 and thus help reducing a temperature change in the exterior body 3 around the projection portions 95. Thus, it can be expected that a user holding the container by touching only a place as near as possible to the tip ends of the projection portions 95, rather than the base ends of the projection portions 95, is hardly affected by the temperature change in the exterior body 3 for a longer time.

[4-3 Exemplary Modification]

The container 1 according to the fourth embodiment is not limited to the example in FIG. 23A. As shown in FIG. 23B, the container 1 according to the fourth embodiment may have a configuration in which the protection material 25 is laminated on the non-facing surface 3B of the exterior material 3 in the fourth embodiment. This mode is referred to as an "exemplary modification of the fourth embodiment". FIG. 23B is an enlarged schematic sectional view of a main portion describing one example of the container 1 according to the exemplary modification of the fourth embodiment. In the exemplary modification of the fourth embodiment, regarding the protection material 25, the same protection material 25 as described in the third embodiment may be used. A lamination method of the protection material 25 and the blank material 30 is not particularly limited. For example, a structure in which the protection material 25 and the blank material 30 are laminated on each other may be formed by bonding the protection material 25 to the tip end or a part near the tip end of the projection portion 95 of the blank material 30 using an adhesive or the like.

According to the container 1 according to the exemplary modification of the fourth embodiment, the same effects as those of the first embodiment can be obtained by forming the projection portion 9 in the exterior material 3.

Further, in the exemplary modification of the fourth embodiment, providing the protection material 25 to the exterior material 3 makes it possible to reduce the exposure of the projection portions 95 and makes it easy to apply printing to the outside surface (the exposed surface) of the exterior material 3, allowing designability of the container 1 to improve.

5 Fifth Embodiment

A container 1 according to the fifth embodiment will be described.

[5-1 Configuration]

The container 1 according to the fifth embodiment has a configuration in which an adhesive is included in at least some of the projection portions 9 on the facing surface 3A of the exterior material 3 in any of the first to fourth embodiments. Except for the configuration in which the adhesive is included in at least some of the projection portions 9 on the facing surface 3A of the exterior material 3, other configurations in the fifth embodiment are the same as those in the first to fourth embodiments, thus description thereof will be omitted. The following describes a case in which the exterior material 3 of the container according to the first embodiment includes the adhesive in the projection portion 9 on the facing surface 3A. Note that this does not prohibit that the adhesive is included in the projection portion 9 of the container 1 according to the second to fourth embodiments. As described above, the adhesive may be included in the projection portion 9 of the container according to the second to fourth embodiments. Note that including the adhesive in the projection portion 9 refers to a state in which the adhesive is attached to the fibers constituting the projection portion 9 and is understood as a concept that includes a case in which the adhesive is attached only to the periphery of the fibers, a case in which the adhesive permeates the inside of the fibers, a case in which a layer of the adhesive covers a certain region of the projection portion 9, and the like.

On the facing surface 3A of the exterior material 3, the adhesive is included in at least some of the projection portions 9 of the exterior material 3. That is, in the exterior material 3, the adhesive may be included in all of the projection portions 9 on the facing surface 3A of the exterior material or in the projection portions 9 disposed in a part of the region of the facing surface 3A. A method of including the adhesive is not particularly limited. For example, the adhesive can be included in the exterior material 3 by spraying the adhesive on the facing surface 3A. A type of the adhesive may be selected according to conditions such as a used application of the container 1, and a starch glue or the like may be appropriately used.

When the adhesive is included in at least some of the projection portions 9 of the exterior material 3, it is preferable that the adhesive is included particularly in the tip end portion 9A or the neighboring region of the tip end portion 9A of the projection portion 9 or that the adhesive is included in the tip end portion 9A and the neighboring region of the tip end portion 9A of the projection portion 9. In this case, the shape stability of the projection portion 9 of the exterior material 3 can be improved while the excellent softness of the exterior material 3 is maintained. The neighboring region of the tip end portion 9A may include a part of the low-density portion 12 on the tip end portion 9A side. In this case, it can be expected that the shape stability of the projection portion 9 of the exterior material 3 is further improved. Further, when the adhesive is included in the tip end portion 9A of the projection portion 9 of the exterior material 3, the adhesive may be included in the tip end portions 9A of all of the projection portions 9 on the facing surface 3A of the exterior material 3 or the adhesive may be included in the tip end portions 9A of the projection portions 9 formed in a part of the region of the facing surface 3A. Further, the adhesive may be included in the tip end portions 9A of selected projection portions 9. For example, the adhesive may be included in the tip end portions 9A of every other projection portion 9 or every two or more projection portions 9. Note that this does not prohibit that the adhesive is included in the peripheral parts of the tip end portions 9A, or the base ends 9B of at least some of the projection portions 9.

In the case where the adhesive is included in the projection portion 9 of the exterior material 3, the adhesive may be included in the low-density portion 12. However, in this case, the adhesive is preferably included to an extent not to deteriorate air permeability of the low-density portion 12. Further, also in this case, it can be expected that the shape stability of the projection portion 9 of the exterior material 3 is improved.

Including the adhesive in the projection portion 9 on the facing surface 3A of the exterior material 3 makes it possible to further enhance the strength of the shape of the projection portion 9 of the exterior material 3 and stabilize the shape of the projection portion 9 in which the adhesive is included. As a result, even if strong external force is applied to the exterior material 3, the shape of the projection portion 9 is hardly deformed by the external force. Further, in the case where the adhesive is included in the low-density portion 12 of the portion 9, the strength of the shape of the low-density portion 12 can be further enhanced.

Note that the adhesive included on the facing surface 3A of the exterior material 3 may be used not only for stabilizing the shape of the projection portion 9 of the exterior material 3 but also for bonding the exterior material 3 and the outer periphery surface 2A of the main body 2 together. That is, the adhesive may not be used for bonding the exterior material 3 and the outer periphery surface 2A of the main body 2 together or may be used for bonding the exterior material 3 and the outer periphery surface 2A of the main body 2 together. Further, also in the case where the adhesive included on the facing surface 3A of the exterior material 3 is used for bonding the exterior material 3 and the outer periphery surface 2A of the main body 2 together, the joint portion 11 described in the first embodiment may be additionally formed.

4 Application Example

Application Example 1

Figure 13:
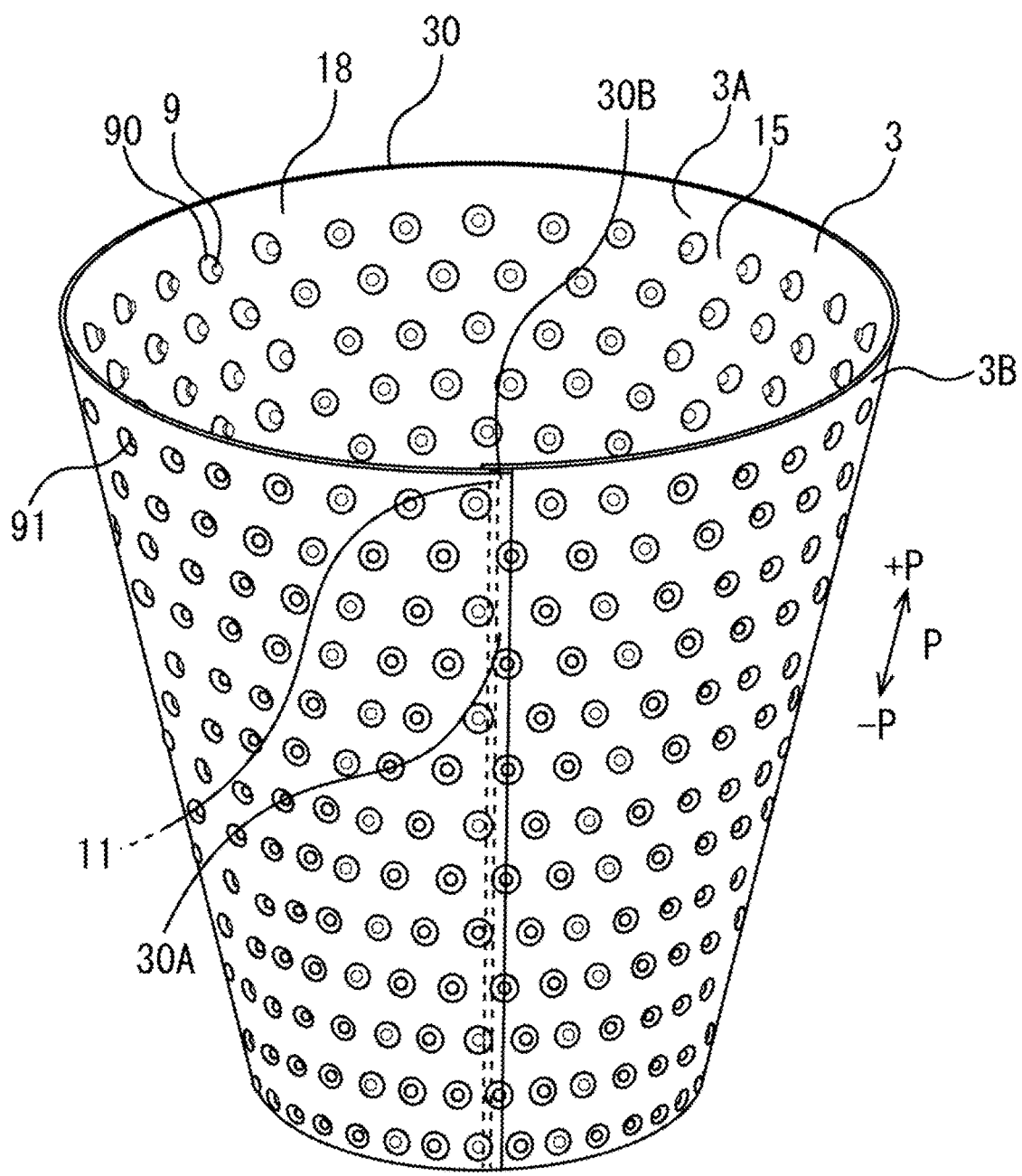
FIG. 13 is a perspective view describing one example in which the exterior material is a sleeve.
Figure 14:
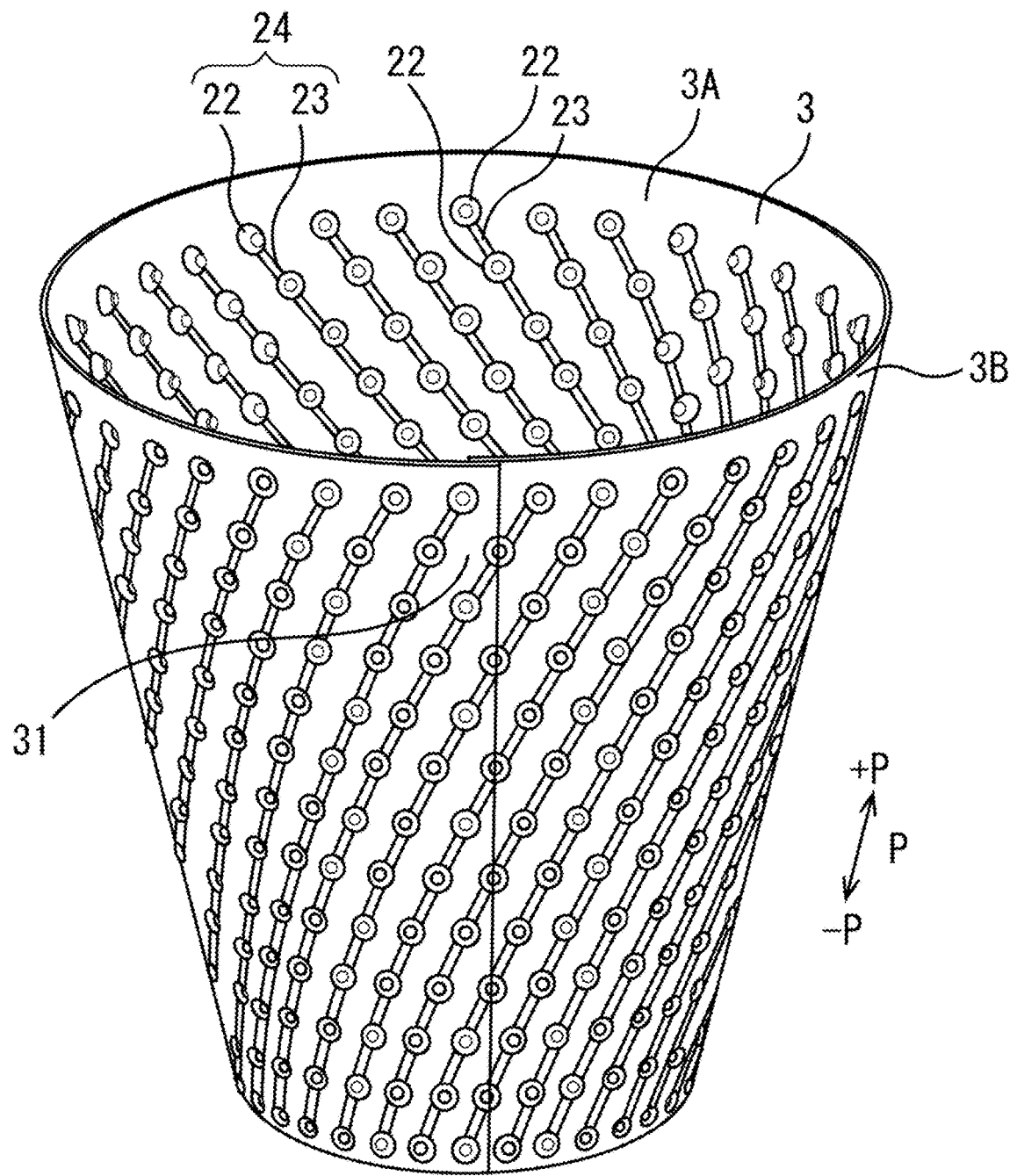
FIG. 14 is a perspective view describing one example in which the exterior material is a sleeve.
Figure 16:
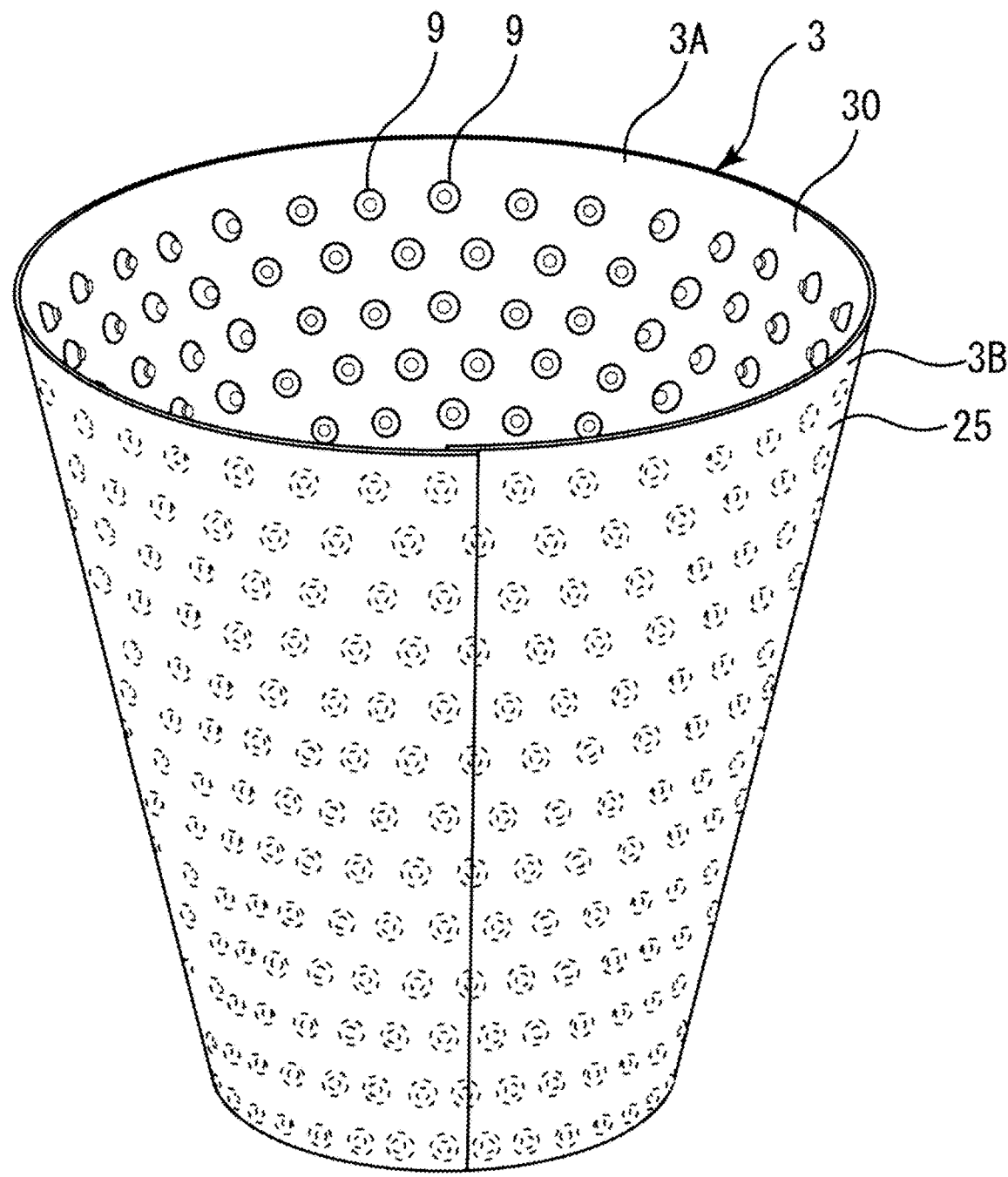
FIG. 16 is a perspective view describing one example in which the exterior material is a sleeve.

The above first to fifth embodiments have been described using the case in which the exterior material 3 is bonded to the outer periphery surface 2A of the main body 2 in the container 1 as an example. The exterior material 3 described in the first to fifth embodiments may be used as a sleeve that is used by detachably attaching to the outer periphery surface 2A of the main body 2. In this case, the exterior material 3 may be separated from the container 1 and be considered as a member different from the container 1. Further, as shown in FIG. 13, FIG. 14, and FIG. 16, the blank material 30 or the blank material 31 constituting the exterior material 3 may be used as a sleeve separated from the container 1. FIG. 13 shows one example of a case where the blank material 30 is formed as a sleeve having a shape corresponding to the shape of the exterior material 3 in the first embodiment. FIG. 14 shows one example of a case where the blank material 31 is formed as a sleeve having a shape corresponding to the shape of the exterior material 3 in the second embodiment. FIG. 16 shows one example of a case where a laminated body of the blank material 30 and the protection material 25 is formed as a sleeve having a shape corresponding to the shape of the exterior material 3 in the third embodiment. Further, in addition to the above, the exterior material 3 obtained by forming the blank material 31 into a cylindrical shape shown in FIG. 21 may be adopted as a sleeve.

Application Example 2

In the application example 1, in the case where the exterior material 3 is separated from the container 1 and considered as a member different from the container 1, the main body 2 and the exterior material 3 may be used by combining the container (the container mentioned here corresponds to the main body 2) and the exterior material 3.

Application Example 3

As shown in FIG. 19A, the embossed sheet forming the blank material 30 constituting the exterior material 3 can be used as a layer constituting a heat insulation sheet 28. As described in the production method of the first embodiment, the embossed sheet is obtained by forming the projection portions 9 in the paper-based sheet 18 by the emboss processing.

In the example in FIG. 19A, the heat insulation sheet 28 includes the above embossed sheet forming the blank material 30, and, as shown in the third embodiment, it has a configuration in which the protection material 25 is laminated on the formation surface of the recessed surface 91 (a surface side corresponding to the non-facing surface 3B).

Further, as shown in FIG. 19B, the heat insulation sheet 28 may have a configuration in which a coating material 26 is laminated on the formation surface of the projected surface 90 (a surface corresponding to the facing surface 3A). A material of the coating material 26 may be the same as that of the protection material 25. The same applies to the embossed sheet forming the blank material 31. The heat insulation sheet 28 including the projection portion 9 is excellent in the heat insulation property as described in the first embodiment and the third embodiment.

Further, the embossed sheet forming the blank material 31 can be also used as a layer constituting the heat insulation sheet 28 (not shown). Note that the embossed sheet forming the blank material 31 is obtained by forming the first projection portion 22 and the second projection portion 23 shown in the second embodiment in the paper-based sheet 18.

In this case, the heat insulation sheet 28 including the first projection portion 22 is excellent in the heat insulation property as described in the second embodiment.

Note that such a heat insulation sheet according to the application example 3 can be specified by having the following configuration. That is, the heat insulation sheet includes the embossed sheet formed from the blank material including the paper-based material. The heat insulation sheet includes a plurality of projection portions that projects from one surface of the embossed sheet and includes base end portions and tip end portions. The projection portion includes a low-density portion in which a density of fibers constituting the paper-based material is smaller than that in the tip end portion and forms a concealing portion at a position closer to the tip end portion than the low-density portion, the concealing portion extending in a surface direction of the blank material and concealing the outer periphery surface.

Next, description of Example of the present invention will be continued.

EXAMPLES

Example 1

A container of the present invention corresponding to FIG. 1 of the above first embodiment was prepared, and the following heat insulation test was performed. Note that, as the container of the present invention, a blank material obtained by subjecting a paper-based sheet made of a paper-based material having a thickness of 0.3 mm to the emboss processing was used. This blank material was formed in a cylindrical shape having a projection portion directed to an inner surface side, thereby forming an exterior body. The exterior body was attached to a main body. In this manner, the container of the present invention was prepared. Note that the container had an internal volume of 240 cc.

(Heat Insulation Test)

Hot water at 70° ° C. in an amount of 180 cc was poured into the container. The time at which the hot water was poured was taken as 0 seconds, and a temperature of the outermost surface (an outside surface) (a non-facing surface of the exterior body) of the container wherein the exterior body was attached was measured until 180 seconds had elapsed from the pouring time. A time (seconds) until a magnitude of temperature rise (° C.) of the outermost surface of the container exceeded 10° C., a time (seconds) until the magnitude exceeded 20° C., and a time (seconds) until the temperature (° C.) of the outermost surface of the container exceeded 50° C. were measured. The result is shown in Table 1.

Comparative Examples 1, 2

As containers of Comparative examples 1 and 2, commercially available containers (conventional products) were prepared, and the heat insulation test was performed using these containers. In the following, the containers of Comparative examples 1 and 2 were referred to as a "first container A for comparison" and a "second container B for comparison", respectively. The heat insulation test was performed in the same manner as in Example 1. The result is shown in Table 1.

TABLE 1

| | Type of container | A time (seconds) until a magnitude of temperature rise (° C.) of the outermost surface of the container exceeded 10° C. | A time (seconds) until a magnitude of temperature rise (° C.) of the outermost surface of the container exceeded 20° C. | A time (seconds) until the temperature (° C.) of the outermost surface of the container exceeded 50° C. |
|---|---|---|---|---|
| Example 1 | Container of present invention | 60 seconds | DA | DB |
| Comparative example 1 | First container A for comparison | 35 seconds | 120 seconds | 90 seconds |
| Comparative example 2 | Second container B for comparison | 50 seconds | DC | 150 seconds |

In the columns in Table 1, symbols DA, DB, and DC indicate that the following results were obtained.

DA: Temperature of outermost surface of container did not increase to exceed 20° C. within time (180 seconds) set as measurement upper limit.

DB: Temperature of outermost surface of container did not exceed 50° C. within measurement time.

DC: Temperature of outermost surface of container did not increase to exceed 20° C. within time set as measurement upper limit.

In the above, detailed descriptions have been given of the examples of the embodiments, the exemplary modifications, and the production methods of the present invention. However, the present invention is not limited to the above examples of the embodiments, the exemplary modifications, and the production methods, and they can be modified in various manners based on the technical idea of the present invention.

Further, the configurations, the methods, the steps, the shapes, the materials, the numerical values, and the like mentioned in the above examples of the embodiments, the exemplary modifications, and the production methods can be mutually combined as long as they do not depart from the spirit of the present invention.

The materials exemplified in the above embodiments may be used singly or in combination of two or more of them unless otherwise specified.

Note that the action and effects exemplified in the present specification are not intended to limit the contents of the present invention.

REFERENCE SIGNS LIST

1 Container
2 Main body
2A Outer periphery surface
3 Exterior material
3A Facing surface
3B Non-facing surface
3C End surface
4 Body portion
4A Body material
5 Bottom surface portion
5A Bottom surface material
6 Opening portion
6A Opening
6B Opening edge portion
7 Curled portion
8 Folded portion
9 Projection portion
9A Tip end portion
9B Base end portion
9C Main raised portion
9D Sub-raised portion
9D1 Front surface portion
9D2 Side surface portion
11 Joint portion
12 Low-density portion
12A End portion
12B End portion
13 Projection portion lateral row
14 Spiral row
15 Peripheral portion
16 Compression portion
17A Flat surface
17B Recessed surface
17C Projected surface
18 Paper-based sheet
18A Fibers
19 First portion
20 Second portion
21 Concealing portion
22 First projection portion
23 Second projection portion
24 Combined structure portion
25 Protection material
26 Coating material
27 Gap
30 Blank material
30A End
30B End
31 Blank material
34 Slit portion
35 Slit-like structural portion
90 Projected surface
91 Recessed surface

The invention claimed is:

1. An exterior material, wherein:
the exterior material is for being used by being attached to an outer periphery surface of a container main body included in a container;
the exterior material is formed from a blank material including a paper-based material;
the exterior material includes a plurality of projection portions each including a base end portion and a tip end portion, the projection portions protruding from a facing surface facing the outer periphery surface;
at least some of the projection portions include a low-density portion in which a density of fibers constituting the paper-based material is smaller than that in the base end portion, and a concealing portion is formed at a position closer to the tip end portion than the low-density portion, the concealing portion extending in a direction that intersects a thickness direction of the blank material and concealing at least a part of the outer periphery surface; and
the low-density portion includes a part in which the density of the fibers constituting the paper-based material becomes smaller from the tip end portion to the base end portion.

2. The exterior material according to claim 1, wherein the low-density portion is formed so as to surround a periphery of the tip end portion of the projection portion.

3. The exterior material according to claim 1, wherein the low-density portion includes a part in which the density of the fibers constituting the paper-based material becomes smaller from the base end portion to the tip end portion.

4. The exterior material according to claim 3, wherein in the low-density portion, the part in which the density of the fibers constituting the paper-based material becomes smaller from the tip end portion to the base end portion and the part in which the density of the fibers constituting the paper-based material becomes smaller from the base end portion to the tip end portion are connected.

5. The exterior material according to claim 1, wherein in the projection portion, a slit portion is formed between the tip end portion and the base end portion.

6. The exterior material according to claim 1, wherein the tip end portion also serves as the concealing portion.

7. The exterior material according to claim 1, wherein a compression portion is formed in the tip end portion.

8. The exterior material according to claim 1, wherein a flat surface is formed in the tip end portion.

9. The exterior material according to claim 1, wherein:
the exterior material includes a first projection portion formed by each of the projection portions and
a second projection portion connecting at least two different first projection portions;
the second projection portion protrudes from the facing surface facing the outer periphery surface; and
a height of the second projection portion is smaller than that of the first projection portions.

10. The exterior material according to claim 9, wherein:
the second projection portion connects two adjacent first projection portions; and
a combined structure portion formed by a combination of the two adjacent first projection portions and the second projection portion connected to the two adjacent first projection portions is continuously formed.

11. The exterior material according to claim 1, wherein a protection material is laminated on a non-facing surface not facing the outer periphery surface.

12. The exterior material according to claim 1, wherein the projections portions are a projected embossed portion.

13. The exterior material according to claim 1, wherein the low-density portion is formed in a cleft-like shape at a position from the base end portion to the tip end portion of the projection portion.

14. The exterior material according to claim 1, wherein the projection portions form a recessed surface on the non-facing surface not facing the outer periphery surface.

15. The exterior material according to claim 1, wherein at least some of the projection portions include an adhesive.

16. The exterior material according to claim 1 for being used as a sleeve attached to the outer periphery surface.

17. A container wherein the exterior material according to claim 1 is attached to the outer periphery surface of the container main body.

18. A combination of a container and an exterior material comprising:
a container including a container main body; and
the exterior material according to claim 1.

* * * * *